United States Patent
Danilak et al.

(10) Patent No.: US 9,778,885 B2
(45) Date of Patent: Oct. 3, 2017

(54) COMPRESSOR RESOURCES FOR HIGH DENSITY STORAGE UNITS

(71) Applicant: Skyera, LLC, San Jose, CA (US)

(72) Inventors: Radoslav Danilak, Cupertino, CA (US); Rodney N. Mullendore, San Jose, CA (US)

(73) Assignee: Skyera, LLC, San Jose, CA (US)

( * ) Notice: Subject to any disclaimer, the term of this patent is extended or adjusted under 35 U.S.C. 154(b) by 24 days.

(21) Appl. No.: 14/108,671

(22) Filed: Dec. 17, 2013

(65) Prior Publication Data

US 2014/0281167 A1    Sep. 18, 2014

Related U.S. Application Data

(60) Provisional application No. 61/788,613, filed on Mar. 15, 2013.

(51) Int. Cl.
*G06F 3/00* (2006.01)
*G06F 3/06* (2006.01)

(52) U.S. Cl.
CPC .......... *G06F 3/0688* (2013.01); *G06F 3/0608* (2013.01); *G06F 3/0658* (2013.01)

(58) Field of Classification Search
None
See application file for complete search history.

(56) References Cited

U.S. PATENT DOCUMENTS

| | | | |
|---|---|---|---|
| 2002/0007417 A1* | 1/2002 | Taylor | G06F 3/0613 709/231 |
| 2006/0212645 A1* | 9/2006 | Petersen et al. | 711/103 |
| 2008/0228998 A1* | 9/2008 | Colecchia et al. | 711/103 |
| 2012/0072641 A1* | 3/2012 | Suzuki | G06F 3/0608 711/103 |

* cited by examiner

*Primary Examiner* — David X Yi
*Assistant Examiner* — Craig Goldschmidt
(74) *Attorney, Agent, or Firm* — McDermott Will & Emery LLP

(57) ABSTRACT

In various embodiments, a high-density solid-state storage unit includes a plurality of flash cards. Each flash card has a flash controller that incorporates one or more resources for facilitating compression and decompression operations. In one aspect, data reduction and data reconstruction operations can be performed in-line as data is stored to and retrieved from flash memory. In another aspect, data reduction and data reconstruction operations can be performed as a service. Any one of the plurality of flash cards can be used to provide data reduction or data reconstruction services on demand for any type of data, including system data, libraries, and firmware code.

13 Claims, 11 Drawing Sheets

COMPRESSOR RESOURCES FOR HIGH DENSITY STORAGE UNITS

CROSS-REFERENCES TO RELATED APPLICATIONS

This application claims priority to U.S. Provisional Application No. 61/788,613, filed Mar. 15, 2013, and entitled "Compressor Resources for high-Density Storage Units," the disclosure of which is incorporated by reference herein for all purposes.

BACKGROUND OF THE INVENTION

Information technology is in the throes of a dramatic transformation. Virtualization is giving way to cloud computing; the ubiquity of powerful handheld devices is creating new paradigms in mobility and social interaction; the massive profusion of information generation is leading to powerful new opportunities for Big Data analytics. Cloud computing has been called "a disruptive force" with the potential for long-term impact on most industries.

Additionally, nowhere is this need for next-generation performance and capacity more critical than in enterprise storage solutions. Organizations are creating more data than ever before and data generation is growing at a staggering rate.

It's not just storage capacity that's a challenge to computing's new paradigm: Speed and performance are equally crucial. Organizations must be able to access their most important data as quickly as possible to act upon it effectively. They need solutions that minimize latency, maximize input/output operations per second (IOPS) and deliver maximum capacity and performance in a cost-efficient manner. Otherwise, the cost of delivering sufficient storage capacity and performance will cripple this new computing paradigm before it ever gets its sea legs.

The storage industry has made great strides in adapting technology to deliver more capacity and better performance without congruent increases in costs. Solutions such as compression, deduplication, and intelligent tiering have made today's disk storage systems far more efficient and have enabled the widespread proliferation of virtualization that has set the stage for the transition to cloud computing.

But those solutions go just so far: Spinning disk storage has practical limitations in speed and performance. The real promise for next-generation performance has always been in solid-state technology. Solid-state technology employs non-volatile flash memory so there are no moving parts, meaning solid-state solutions operate much faster than traditional disk drives in reading and writing data. A single enterprise-grade solid-state solution can handle a transaction workload of 100 traditional hard drives—with more reliability and less power consumption in a much smaller physical space.

Most of the leading enterprise storage vendors incorporate solid-state technology as part of their overall solutions, but in limited capacities usually targeted for specific, storage-intensive production applications that require very high levels of performance: Video editing, computer-aided design and high-end online transaction processing systems (OLTPs) are some of the obvious choices.

The challenge in deploying solid-state technology more ubiquitously across the enterprise—for all enterprise applications—has been one of cost. Although NAND Flash solutions could deliver 100 times the performance of traditional spinning disks—at one-tenth the power consumption—they have also been about 10 times more expensive to deploy.

Simply, the cost of deploying robust enterprise-grade solid-state technology has been too high for widespread deployment across all enterprise applications. However, that excuse will not suffice for the future, as the performance level ensured by solid-state technology becomes even more critical for all applications across all types of businesses.

The reality is that the capacity and performance of solid-state technology will be a necessary part of next-generation data center infrastructures if these infrastructures are to deliver on the promise of cloud computing, Big Data and all of the other critical aspects of computing's next era. Enterprise-grade solid-state technology will be crucial to the underlying storage infrastructure—driving all enterprise applications—to meet ever-changing requirements for performance, speed, capacity, and agility.

Next-generation solid-state technology for the enterprise must be robust, reliable, fully featured, and cost-efficient: It must go beyond what is available in solid-state today, particularly when IT decision-makers think about typical solid-state drives (SSDs) that use HDD protocols to speak to the rest of the world. This deployment of solid-state technology has been useful in their initial applications, such as in laptop computing, but is nowhere near the right design for true enterprise-grade solid-state storage. The challenge to the storage industry has been to figure out how to deliver enterprise-grade performance and reliability in solid-state technology at a reasonable cost for widespread enterprise appeal.

Accordingly, what is desired is to solve problems relating to data reduction and compression in solid-state storage, some of which may be discussed herein. Additionally, what is desired is to reduce drawbacks relating to data reduction and compression in solid-state storage, some of which may be discussed herein.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

In various aspects, data services are provided by high-density solid-state storage unit according to the present invention. The high-density solid-state storage unit includes a plurality of solid-state storage cards (or flash cards) each having one or more solid-state modules (or flash modules) for storing data. In general, data received by a solid-state storage card may be stored in one or more of the flash modules according to one or more data services provided by a controller associated with the solid-state storage card. Data may also be retrieved from one or more of the flash modules and processed according to one or more data services provided by a controller associated with the solid-state storage card. In one aspect, the controller associated with each solid-state storage card may be utilized as a resource to provide data services (such as compression or decompression) for data not otherwise designated to be stored in the flash modules of the solid-state storage card whose controller is performing the data services.

In one embodiment, a controller for interfacing between a host controller in a host device and a flash memory device includes a compressor resource configured to perform a plurality of compression operations. At least one compression operation in the plurality of compression operations is configured to compress data transferred between the host controller and the controller and intended for storage in the flash memory device. Furthermore, at least one compression operation in the plurality of compression operations is configured to compress data transferred between the host controller and the controller and intended for further processing or handling by the host controller.

In another embodiment, a controller for interfacing between a host controller in a host device and a flash memory device includes a decompressor resource configured to perform a plurality of decompression operations. At least one decompression operation in the plurality of decompression operations is configured to decompress data transferred between the controller and the flash memory device and intended for further processing or handling by the host controller. Furthermore, at least one decompression operation in the plurality of decompression operations is configured to decompress data transferred between the host controller and the controller and intended for further processing or handling by the host controller.

In one embodiment, high-density solid-state storage system includes a plurality of solid-state storage devices. A host controller is configured to store data to and retrieve data from each of the plurality of solid-state storage devices. Each solid-state storage device further includes a controller configured to provide at least one of data reduction and data reconstruction services to the host controller for data retrieved from or stored to the solid-state storage device. The controller may further be configured to provide at least one of data reduction and data reconstruction services to the host controller on demand for data not otherwise intended for direct storage in the solid-state storage device.

In various embodiments, a method for providing data services in a high-density solid-state storage system includes selecting, with a host controller device, one of a plurality of solid-state storage devices accessible to the host controller device that offer on-demand data compression services to compress data. A data transfer is initiated by the host controller device transferring uncompressed data to the selected one of the plurality of solid-state storage devices to generate compressed data. A data transfer is initiated by the selected one of the plurality of solid-state storage devices transferring the compressed data from the selected one of the plurality of solid-state storage devices. One or more operations may then be performed by the host controller device on the compressed data.

In various embodiments, a method for providing data services in a high-density solid-state storage system includes selecting, with a host controller device, one of a plurality of solid-state storage devices accessible to the host controller device that offer on-demand data decompression services to decompress data. A data transfer is initiated by the host controller device transferring compressed data to the selected one of the plurality of solid-state storage devices to generate uncompressed data. A data transfer is initiated by the selected one of the plurality of solid-state storage devices transferring the uncompressed data from the selected one of the plurality of solid-state storage devices. One or more operations may be performed by the host controller device on the uncompressed data.

In one embodiment, a high-density solid-state storage system includes a processor, a plurality of solid-state storage devices, each solid-state storage device having a controller device and at least one flash memory device, the controller device configured to control data transfers between the processor and the at least one flash memory device, the controller further configured to provide data services to the processor for data transferred between the processor and the controller that the controller is not configured to store in the at least one flash memory device, and a memory configured to store a set of instructions which when executed by the processor configured the processor to select one of a plurality of solid-state storage devices, receive information indicating success of a data transfer transferring first data to the selected one of the plurality of solid-state storage devices to generate second data, receive information indicating success of a data transfer transferring the second data from the selected one of the plurality of solid-state storage devices, and perform one or more operations with the second data.

In one aspect, the data services provided to the processor include at least one compression service. In another aspect, the data services provided to the processor include at least one decompression service. In a further aspect, the data services provided to the processor include at least one data reduction service. In another aspect, the data services provided to the processor include at least one data reconstruction service.

In some embodiments, the first data comprises a combination of a plurality of compressed data portions and wherein the second data comprises a single unit of decompressed data. To select one of the plurality of solid-state storage devices the processor may determine availability of the data services of each of the plurality of solid-state storage devices. The processor may further select one of the plurality of solid-state storage devices for storage of the second data subsequent to performing the one or more operations with the second data. The processor may initiate a data transfer transferring the second data to the selected one of the plurality of solid-state storage devices subsequent to performing the one or more operations with the second data.

In various embodiments, a method includes selecting, with one or more processors associated with one or more computer systems, one of a plurality of solid-state storage devices, each solid-state storage device having a controller device and at least one flash memory device, the controller device configured to control data transfers between the processor and the at least one flash memory device, the controller further configured to provide data services to the processor for data transferred between the processor and the controller that the controller is not configured to store in the at least one flash memory device, receiving, at the one or more computer systems, information indicating success of a data transfer transferring first data to the selected one of the plurality of solid-state storage devices to generate second data, receiving, at the one or more computer systems, information indicating success of a data transfer transferring the second data from the selected one of the plurality of solid-state storage devices, and perform one or more operations with the second data.

In some embodiments, a solid-state storage device includes a plurality of solid-state storage modules configured to store data, circuitry configured to store data to and retrieve data from each of the plurality of solid-state storage devices, and circuitry configured to provide one or more data services on demand to a host controller for data not designated to be directly stored in the plurality of solid-state storage modules. The circuitry configured to provide one or more data services may be configured to provide data compression services, data decompression services, data reduction services, or data reconstruction services for both the data stored to and retrieved from each of the plurality of solid-state storage devices and the data not designated to be directly stored in the plurality of solid-state storage modules A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION OF THE INVENTION

Introduction

Figure 1:
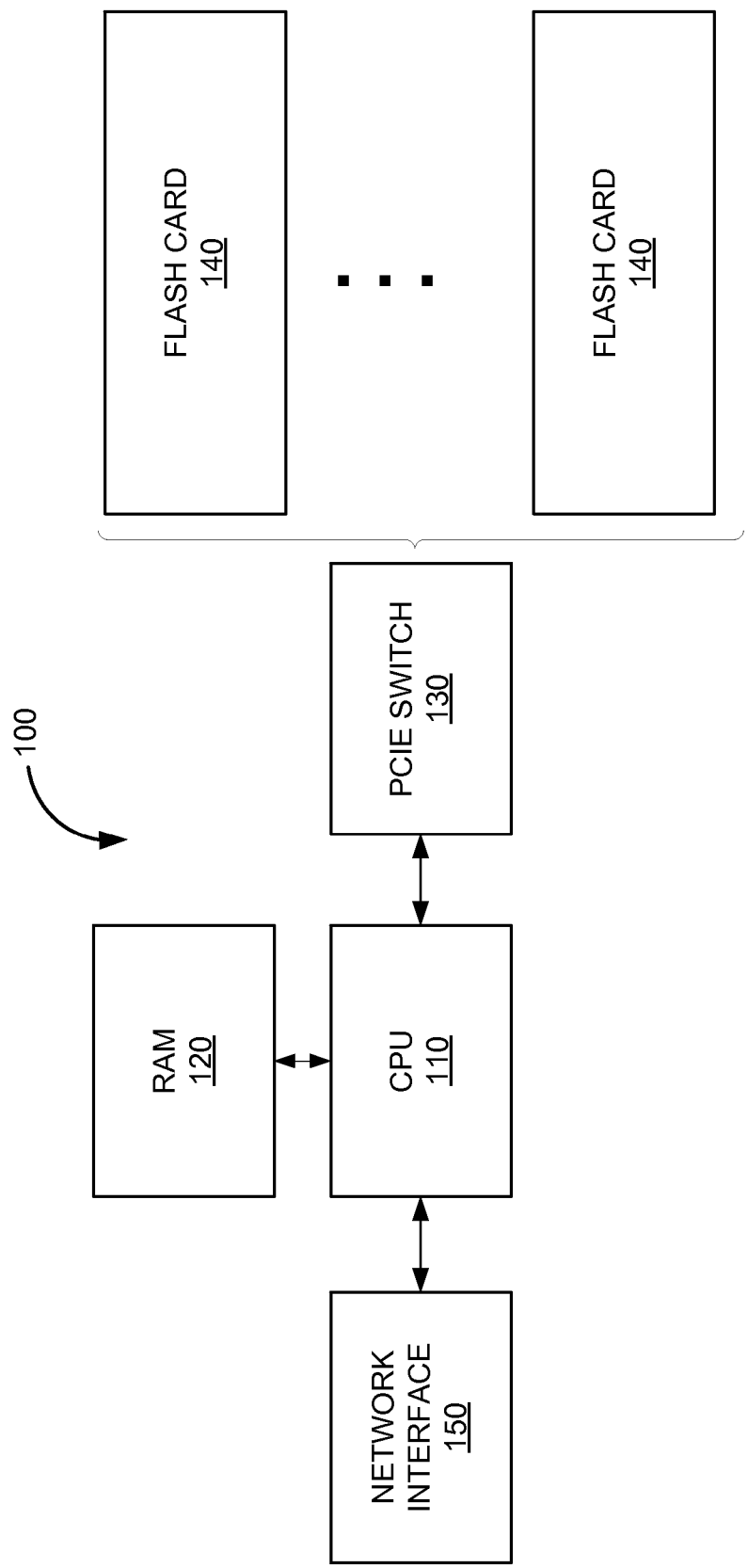
FIG. 1 is a block diagram of a high-density solid-state storage unit in one embodiment according to the present invention.

FIG. 1 is a block diagram of high-density solid-state storage unit 100 in one embodiment according to the present invention. High-density solid-state storage unit 100 may be embodied as an all-Flash enterprise solid-state storage system. One example of high-density solid-state storage unit 100 is skyHawk as provided by Skyera of San Jose, Calif.

In this embodiment, high-density solid-state storage 100 includes central processing unit (CPU) 110, random access memory 120, PCIE switch 130, a plurality of flash cards 140, and a network interface 150. High-density solid-state storage 100 can include hardware and/or software elements configured for performing logic operations and calculations, input/output operations, machine communications, or the like. High-density solid-state storage 100 may include familiar computer components, such as one or more data processors or central processing units in addition to CPU 110, one or more graphics processors or graphical processing units (GPUs), one or more memory subsystems in addition to RAM 120, one or more storage subsystems in addition to the plurality of flash cards 140, one or more input/output (I/O) interfaces, communications interfaces, or the like. High-density solid-state storage 100 can include one or more system buss interconnecting the depicted components and providing functionality, such as connectivity and inter-device communication. High-density solid-state storage 100 may be embodied as a computing device, such as a personal computer (PC), a workstation, a mini-computer, a mainframe, a cluster or farm of computing devices, a laptop, a notebook, a netbook, a PDA, a smartphone, a consumer electronic device, a gaming console, or the like.

CPU 110 is representative of one or more data processors or central processing units (CPUs) that include hardware and/or software elements configured for executing logic or program code or for providing application-specific functionality. Some examples of CPU 110 can include one or more microprocessors or micro-controllers. CPU 110 may include 4-bit, 8-bit, 12-bit, 16-bit, 32-bit, 64-bit, or the like architectures with similar or divergent internal and external instruction and data designs. CPU 110 may further include a single core or multiple cores. In some aspects, each of a set of one or more cores associated with CPU 110 may be configured for executing logic or program code or for providing application-specific functionality different from other sets of one or more cores associated with the CPU 110.

CPU 110 may be embodied as commercially available processors such as those provided by Intel of Santa Clara, Calif. (e.g., x86, x86_64, PENTIUM, CELERON, CORE, CORE 2, CORE ix, ITANIUM, XEON, etc.) and by Advanced Micro Devices of Sunnyvale, Calif. (e.g., x86, AMD_64, ATHLON, DURON, TURION, ATHLON XP/64, OPTERON, PHENOM, etc). Commercially available processors may further include those conforming to the Advanced RISC Machine (ARM) architecture (e.g., ARMv7-9), POWER and POWERPC architecture, CELL architecture, and or the like. CPU 110 may also include one or more field-gate programmable arrays (FPGAs), application-specific integrated circuits (ASICs), or other microcontrollers. CPU 110 may include any number of registers, logic units, arithmetic units, caches, memory interfaces, or the like. CPUs 100 may further be integrated, irremovably or moveably, into one or more motherboards or daughter boards of high-density solid-state storage unit 100.

In some embodiments, CPU 110 may include one or more graphics processor or graphical processing units (GPUs) configured for executing logic or program code associated with vector or parallel processing functionality. Some examples of GPUs are commercially available from NVIDIA, ATI, and other vendors. In various embodiments, CPU 110 may include one or more vector or parallel processing units.

RAM 120 is representative of one or more memory subsystems. RAM 120 can include hardware and/or software elements configured for the storage and retrieval of information. RAM 120 may store information using machine-readable articles, information storage devices, or computer-readable storage media. Some examples of a memory subsystem can include random access memories (RAM), read-only-memories (ROMS), volatile memories, non-volatile memories, and other semiconductor memories. In various embodiments, RAM 120 can include data and program code for coordinating various components of high-density solid-state storage unit 100 as well as data reduction in high-density solid-state storage unit 100.

PCIE Switch 130 is representative of one or more mechanisms providing communication between CPU 110 and the plurality of flash cards 140. Flash Cards 140 are representative of a set of solid-state devices (SSDs). An individual Flash card 140 may be embodied as a solid-state storage blade provided by Skyera of California. Flash Card 140 includes hardware and/or software elements configured to perform flash management.

In one aspect, one of the main factors for the relatively slow adoption of the widespread use of flash, for all but the most performance-sensitive business applications, is cost. Due to its relatively high acquisition cost, solid-state storage capacity has been relegated to a very small portion (<1%) of total production storage deployed in the enterprise.

Like any physical hardware device, flash storage capacity has a limited lifespan. When data is written to a flash cell, an electrical charge records the data written onto the silica. When data is changed in the flash cell, two operations take place—one to restore the cell to a known ("erased") state and a second to write the new data; these operations are referred to as program/erase (P/E) cycles. P/E cycles eventually result in the demise of the corresponding flash cell and ultimately the entire module.

High-density solid-state storage unit 100 may incorporate one or more of two types of flash memory technologies: MLC, or multi-level cell flash and SLC, single level cell flash. MLC allows multiple data bits to be stored per flash cell while SLC stores a single data bit per flash cell. The most common form of MLC flash stores 2 data bits per cell but there is also a version which stores 3 bits per cell known as TLC. MLC can be further subdivided into eMLC (the "e" is for Enterprise grade). The number of program/erase (P/E) cycles that can be handled ranges from approximately 100,000 for SLC, 30,000 for 2-bit eMLC, 3,000 for 2-bit MLC, and 300 for TLC in the latest flash generation over the working lifetime of a cell. The greater endurance of SLC, and even 2-bit eMLC, over the latest generation 19/20 nm 2-bit MLC comes at a significant price premium.

Today's enterprise solid-state storage solutions utilize SLC or 2-bit eMLC NAND Flash storage due to limitations in their flash controllers and overall system design. High-density solid-state storage unit 100 includes Flash Card 140 to take advantage of this latest generation, and consequently lowest cost MLC Flash without sacrificing performance, reliability or durability. Flash Card 140 and CPU 110 employ advanced flash management algorithms to reduce P/E cycles on the NAND and the resulting impact of those cycles. In addition, high-density solid-state storage unit 100 can employ one or more implementations of RAID-SE (similar to RAID-6, but custom designed for Flash), in conjunction with controller-based compression as discussed further below, results in 10× fewer writes to the Flash module.

Network interface 150 is representative of a network communications interface. Network interface 150 can include hardware and/or software elements configured for performing communications operations, including sending and receiving data. Some examples of network interface 150 may include a network communications interface, an external bus interface, an Ethernet card, Fibre Channel card, Infiniband card, PCIe card, a modem (telephone, satellite, cable, ISDN), (asynchronous) digital subscriber line (DSL) unit, FireWire interface, USB interface, or the like. For example, network interface 150 may be coupled to a communications network or external bus, such as a computer network, to a FireWire bus, a USB hub, or the like. In other embodiments, network interface 150 may be physically integrated as hardware on a motherboard or daughter board of high-density solid-state storage unit 100, may be implemented as a software program, or the like, or may be implemented as a combination thereof.

In various embodiments, high-density solid-state storage unit 100 may include software that enables communications over a network, such as a local area network or the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to high-density solid-state storage unit 100. In further embodiments, high-density solid-state storage unit 100 may include software that enables network attached storage (NAS) communications, direct attached storage (DAS) communications, storage area network (SAN) communications, or the like. In some embodiments, other data storage software, transfer protocols, or interconnets may also be used, for example ATA over Ethernet (AoE) mapping of ATA over Ethernet, Fibre Channel Protocol (FCP) mapping of SCSI over Fibre Channel, Fibre Channel over Ethernet (FCoE), ESCON over Fibre Channel (FICON), HyperSCSI mapping of SCSI over Ethernet, iFCP or SANoIP mapping of FCP over IP, iSCSI mapping of SCSI over TCP/IP, iSCSI Extensions for RDMA (iSER) mapping of iSCSI over InfiniBand, storage networks may also be built using SAS and SATA technologies, or the like.

Figure 2A:
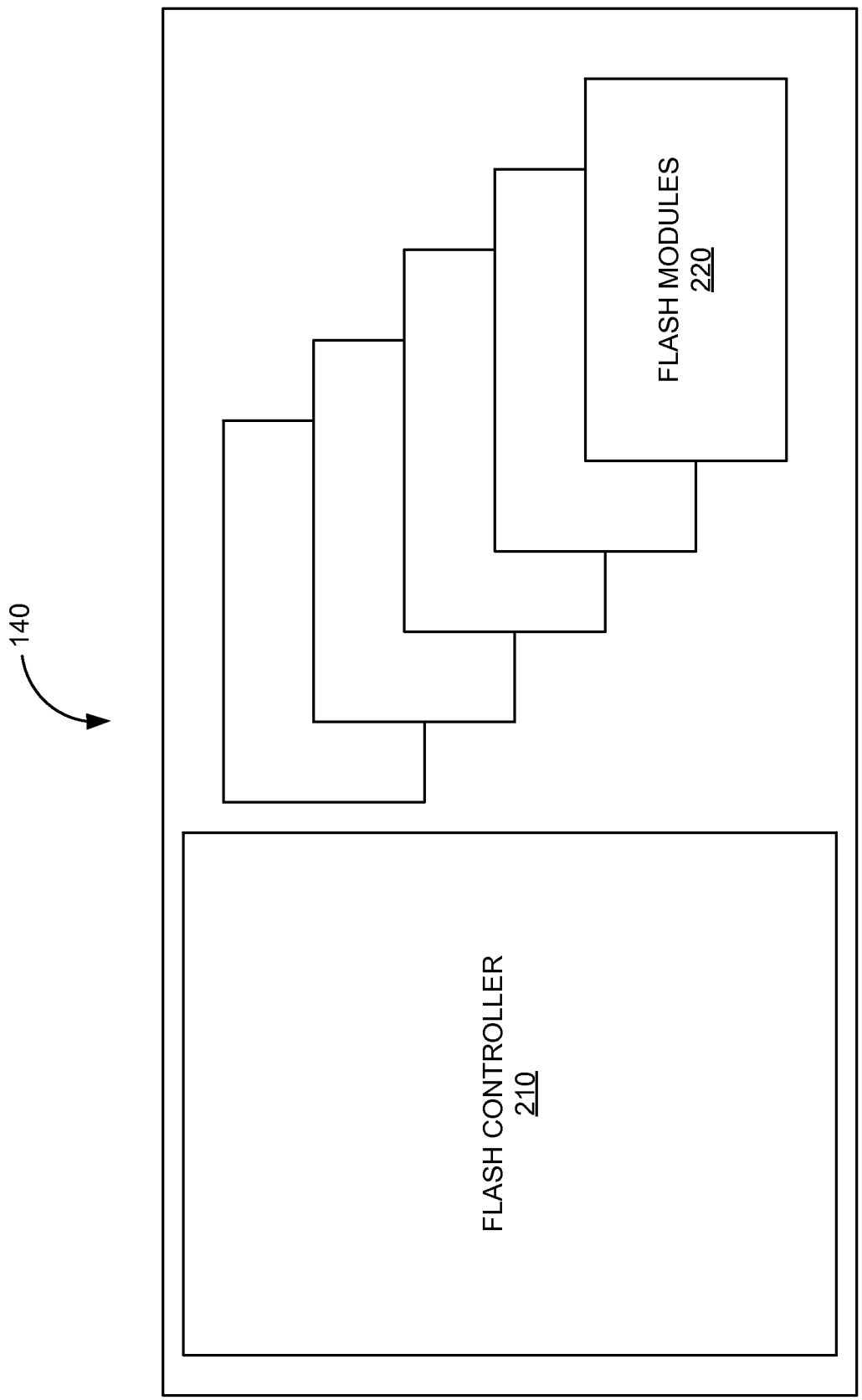
FIGS. 2A and 2B are block diagrams illustrating storage management of the high-density solid-state storage unit of FIG. 1 in one embodiment according to the present invention.
Figure 2B:
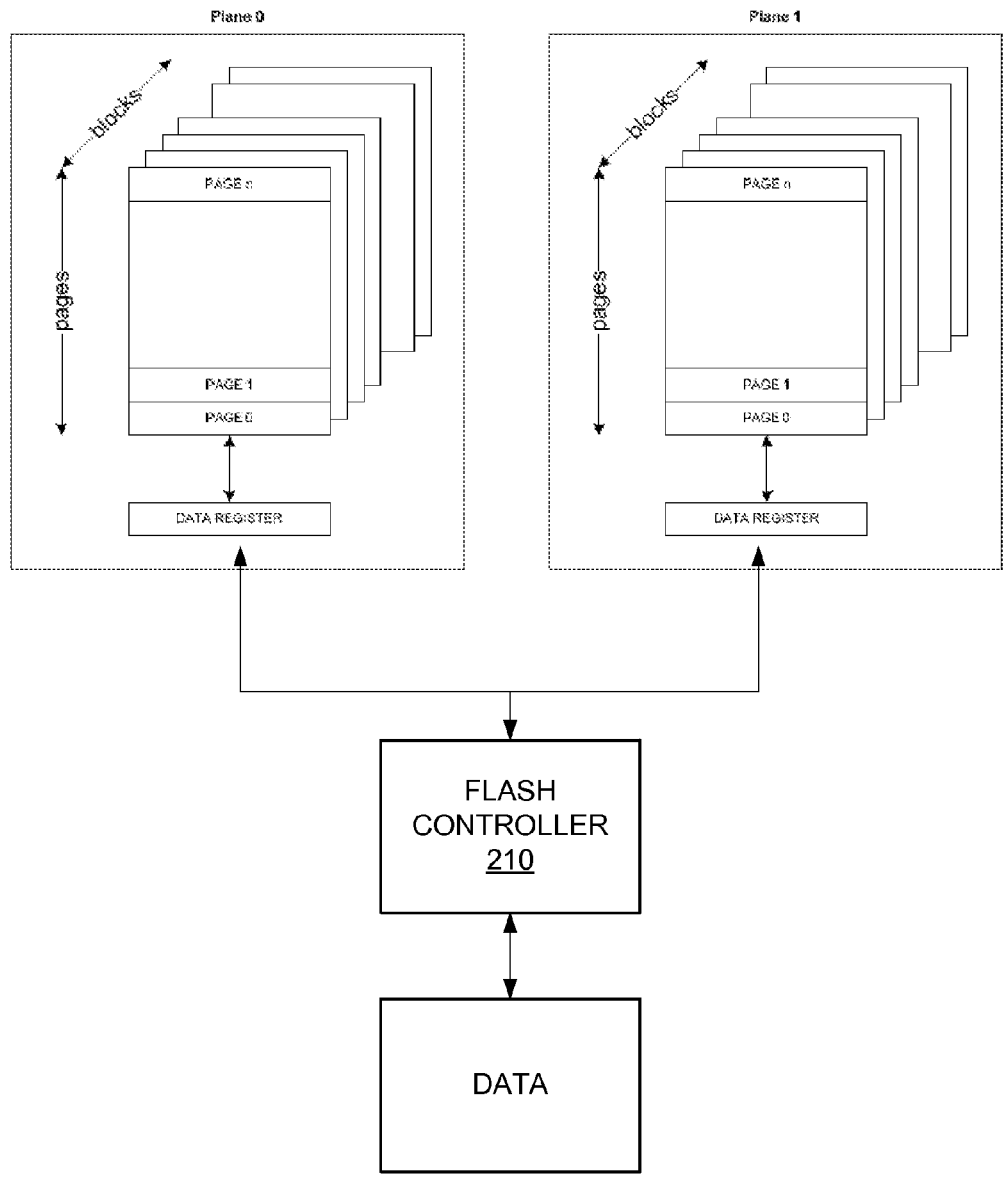

FIGS. 2A and 2B are block diagrams illustrating storage management of high-density solid-state storage unit 100 of FIG. 1 in one embodiment according to the present invention. FIG. 2A is a block diagram of one of the plurality of flash cards 140 that can be used with high-density solid-state storage unit 100 of FIG. 1 in one embodiment according to the present invention. In this example, flash card 140 includes flash controller 210 and one or more flash modules 220. Flash controller 210 is representative of one or more processors, FPGAs, ASICs, or other microcontrollers that include hardware and/or software elements configured for executing logic or program code or for providing application-specific functionality. Flash modules 220 are representative of flash memory modules or other solid-state devices (SSDs).

In order to better understand one or more of the inventions presented within this disclosure, aspects of at least one environment within which various embodiments may operate will first be described with respect to FIG. 2B.

In general, flash modules 220 are organized into a hierarchical order where planes are a set of blocks and blocks are a set of pages as shown in FIG. 2B. A page is composed of a set of bits which are read or programmed at the same time. A page is the smallest unit of data which can be read or programmed in the cell memory. For newer Flash devices, the page size is nominally 16 KB or larger. Note that a Flash page is actually larger than its "nominal" size. The extra bytes in the Flash page are for Metadata and ECC bytes. The nominal size is the expected amount of actual data.

A block is composed of a set of pages which is typically 128, 256, or 512. A block is the smallest unit of Flash memory that can be erased. Thus, an individual Flash page cannot be erased, instead, the entire Flash Block (i.e., all pages in the block) are erased at the same time. The block size is determined by the number of pages per block times the page size. As an example, a 64 Gb Flash device may have a page size of 16 KB, 256 pages, and 2048 blocks (a block size of 4 MB).

The blocks are further divided into planes which is typically 2 where the even numbered blocks are in plane 0 and the odd numbered blocks are in plane 1. Most Flash devices implement 2 or more planes. The main purpose of planes is that Flash operations can be performed on both planes at the same time. This has the effect of doubling the page size (assuming 2 planes) and can increase the overall performance of the Flash device. This is particularly true when programming data to the Flash device. Flash devices support 1-plane commands as well as 2-plane commands.

There are 4 basic operations performed on a Flash device: Page Read, Read Data Transfer, Page Program, and Block Erase. Other operations exist which are related to management of the device such as reading the device ID, reading parameters, or setting feature values. Block Erase—A block erase command specifies a block (in an address field of the command) to be erased. Erasing a block causes all bits in the block to be changed to 1. The time required for an erase command (tBERS) varies from 800 uS to 10 mS. An erase error is reported if a bit remains at 0. Page Read—A Page Read command transfers data from the Flash array to the Data Register (see FIG. 5). The amount of time required for the transfer to complete (tR) varies by device but typical values vary from 25 uS to 100 uS although some devices have a value up to 400 uS. When all of the page data has been transferred into the data register, the contents of the data register can be transferred to the Flash controller. If data is transferred, it must be transferred from byte 0 in the data register. It is not necessary to transfer all of the page data (i.e. the data transfer can be stopped at any time).

Read Data Transfer—Transferring data from the data register following a Page Read command can be accomplished by performing a Random Data Out command which can transfer the data register contents beginning at any position within the data register. Any number of bytes may then be transferred. Note that while the entire Page is read from the Flash Array, only a section of the page data needs to be transferred to the Flash Controller. Page Program—A Page Program command transfers the contents of a Flash page from the Flash Controller to the Flash device's data register. After the data transfer has been completed, the data register contents are programmed into a page in the Flash array. The page to be programmed is specified by an address field at the beginning of the command. The programming time (tPROG) varies by device from 200 uS to 3-4 mS. The data transfer time is not included in the tPROG value.

Programming a page converts bits in a page from one (the erased value) to zero. If a bit is being programmed to a value of one, the cell value is not modified. A programming error can occur when P bits cannot be changed to zero where P is Flash Device Dependent. Bits being programmed as 1 may not be checked. When programming, a page can only be programmed once. Before the page can be programmed again, the block needs to be erased. Older devices supported "partial page programming" but newer devices generally do not support partial page programming. The programming of pages usually is done sequentially. In other words, a device with 256 pages per block needs to program the pages within a block in the order 0 . . . 255. However, it may be acceptable to skip pages.

NAND Flash devices are typically available in 2 common types: SLC and MLC. SLC stands for Single Level Cell and MLC stands for Multi-Level Cell. An SLC device stores 1 bit for each cell. A single level is needed to distinguish whether the cell contains a logic 0 or a logic 1. An MLC device stores N bits per cell where N is typically 2 but can be 3 or more. For the purposes of this document, MLC will mean 2 bits per cell. The term 3LC (or TLC) will mean 3 bits per cell and the term 4LC (or QLC) will mean 4 bits per cell.

Devices which support more than 2 bits per cell are used consumer electronics (e.g. Flash based music players) but do not lend themselves to use in SSD due to their low endurance (e.g. low number of P/E cycles). However, some SSD use TLC where the number of P/E cycles required is reduced.

MLC devices have an advantage in cost because the cost per bit is effectively reduced by half. Flash manufacturers typically produce 2 versions (an SLC and an MLC version) of a Flash chip for a given device geometry. The MLC device will have twice as many bits as the SLC device. For example, a 32 Gb SLC device and a 64 Gb MLC device will generally be developed at the same time. Note that the only basic difference is the sensing logic when reading data since an MLC device requires three levels to be detected versus a single level for an SLC device. The control logic for programming will also be different since there are multiple levels to set the value of the cell bits.

An MLC device will have a lower endurance because it becomes easier for a cell's value to be interpreted incorrectly when being read. In other words, there is less margin around the nominal value for a given level. Cell voltage shifts due to time, temperature, and age cause a problem quicker (i.e. after fewer P/E cycles) for an MLC device than for an SLC device. As an example of the endurance difference between SLC and MLC devices, 8 Gb SLC devices are generally specified with an endurance of 100,000 P/E cycles while a 16 Gb MLC device (with the same device geometry) is specified with an endurance of 10,000 P/E cycles.

MLC devices generally distribute the bits in a Flash cell to different Flash Pages. For an MLC (i.e. 2-bit per cell) device, there is a "lower" page and an "upper" page. The upper and lower pages are also not contiguous. The lower page of an MLC cell is programmed first and the upper page is programmed second.

In general, flash card 140 and CPU 110 provides an important aspect of Flash management with use of Super-Blocks and Super-Pages, SBlocks, and S-Pages. When writing data, writes can occur over a series of pages spread across many or all of flash modules 220. As data arrives (or is garbage collected), it may be written sequentially to two pages per die (one per plane), then to two pages in the next flash module (or die) in the sequence which is usually located on a different channel.

Frequently, although not necessarily, the pages will have the same addresses: that is pages A and A+1 of block B on die C is followed by pages A and A+1 of Block B on die C+1. This simplifies the management for firmware, although bad block management frequently thwarts such an approach. S-Blocks are the series of blocks containing a set of S-Pages. When garbage collection is performed, it is performed on an S-Block, allowing the S-Block or its constituent blocks to be reused.

Hard Disk Drives are nominally direct mapped. An LBA (Logical Block Address) will specify a specific sector location within the hard drive (e.g. platter, track, and sector). The only exception is a small number of spare sectors used to replace bad sectors. The hard drive will maintain a small table to allow bad sectors to be replaced by a spare sector. When a command is received to access (read or write) an LBA, the table is first searched to determine if the LBA has been remapped to a spare sector. If the LBA has been remapped, the LBA is internally modified to access the assigned spare sector. Otherwise, the LBA is used to derive the specific platter, track and sector.

An SSD could also be direct mapped to Flash data where the block, page, and page offset are derived from the LBA. However, the same Flash block would be used to hold the same set of Logical Blocks. Since a Flash Block has a limited life, accesses to the SSD that are not evenly distributed can result in a given block's life being exceeded much earlier than other blocks. In addition, a Flash block may fail or be invalid (marked as bad during manufacturing test). Therefore, remapping of all blocks was used in early SSD where a table contains an entry for each block addressed by the LBA. As an example, assume that an SSD is 64 GB with 1 MB blocks, 8 KB Flash pages, and a 512-Byte Logical Block size. The host sees a drive with 61,036 blocks (64,000,000,000/(1024*1024)) of size 1 MB. Therefore, the SSD would have a table of 61,036 entries that remaps the block field in the LBA to the physical Flash block to be accessed.

Flash Block Remapping Advantages: Simplicity—The mapping logic is straightforward and the mapping table is relatively small and can be maintained in on-chip SRAM for small SSD. Excellent read performance—The read performance for both random and sequential accesses is very good. Performance for random accesses may be slightly worse if the size of the data read is less than the Page size. For example, random 512-Byte (single logical block) commands require a new Flash page be accessed for each command while sequential 512-Byte commands require a new Flash page be opened every N commands (where N=Page Size/ 512). Excellent Sequential Write performance—When the host writes data sequentially, the SSD controller can write data to a new block without needing to copy data from the old block. The SSD Controller may need to remember temporarily the old block in order to perform reads or copy data if the entire block is not written.

Flash Block Remapping Disadvantages: Poor Random Write Performance—Note that this implies that data is written to random Logical Block addresses not that the data content is random. When random writes are performed, only part of a Flash block is modified which requires that the remainder of the block be copied. Therefore, a large portion of a Flash block may need to be read from the old block and rewritten to the new block. For example, assume 4 KB random writes are performed and the Flash Block Size is 1 MB. This would require that 1020 KB of data be read and rewritten resulting in a minimum write amplification of 256:1 (1 M/4K). Wear Leveling is required to balance out the P/E cycles over the Flash Blocks for maximum lifetime of the SSD.

Flash Block Mapping was used in early implementations of Solid State drives. Mapping by logical Block (e.g. sector) is now the normal method for the way that host data is mapped to Flash Memory in an SSD. Logical Block Mapping requires a "Map" Table that contains one entry for every Logical Block defined for the SSD. For example, if a 64 GB SSD that supports 512-Byte logical blocks would advertise to the host that it has 125,000,000 logical blocks. A Map Table entry contains the current location of the corresponding logical block in the Flash Memory. In a typical SSD, a Flash Page holds N integral Logical Blocks (i.e. a Logical Block does not span across two Flash Pages). For example, an 8 KB Flash page would hold 16 Logical Blocks (of size 512). Therefore, the Map Table entry contains a Page Offset field which identifies where a Logical Block's data begins in the Flash Page Data (e.g. at byte 512*Page Offset).

The size of the Map Table prevents the Table from being held inside the SSD controller. Typically, the Map table is held in an external DRAM connected to the SSD controller (e.g., RAM 120). The size of the Map Table will scale (slightly) non-linearly with the size of the SSD because the width of the Table entry will increase by 1 bit for each doubling of the Flash Memory. For example, a 128 GB drive requires 834 MB for the Map table (28b/8b*250E6/ (1024*1024)).

Logical block data is written in the order that the data is received. In the simplest model, a Flash block (or set of Flash blocks) is used as current write blocks. Data is accumulated until a complete Flash Page is received and is then written to the Flash device. Flash Pages in a block are written until the block has been completely written then a new block must be selected to be written. Blocks from multiple die may be written in parallel to allow a higher write rate. For example, if an SSD has 32 Flash die, one block from each die could be currently used for writing of data allowing up to 32 times higher write throughput (due to the potential for 32 Program operations to be in progress concurrently).

When a Logical Block is written, the corresponding Map Table entry is updated to reflect the new location of the Logical Block. When a Logical Block is read, the corresponding Map Table entry is read to determine the location in Flash Memory that needs to be read. A read will then be performed to the Flash Page specified in the Map entry. When the read data is available for the Flash Page, the data at the offset specified by the Map Entry is transferred from the Flash device to the host.

When a Logical Block is written, the Flash Memory holding the "old" version of the data becomes "garbage" (i.e., the previous data is no longer valid). Note that when a Logical Block is written, the Flash Memory will initially contain at least 2 versions of the Logical Block. The most recently written version (pointed at by the Map Table) is the "valid" version while all other versions are "stale" (no longer valid). These "stale" entries are referred to as garbage.

Logical Block mapping leads to the need to perform Garbage Collection on blocks prior to erasing a block. The SSD must implement an algorithm that picks the next block (or blocks) to be erased (and then to be written). Note that the SSD should select blocks to be erased and erase the blocks prior to needing the blocks for write purposes.

Logical Block Remapping Advantages: Very Good Random Write Performance—Note that this implies that data is written to random Logical Block addresses not that the data content is random. The primary motivation for Logical Block mapping is that it is not necessary to re-write an entire Flash Block when random data is written to the SSD. Note that the Random Write Performance will be affected by the Garbage Collection operation. Garbage Collection will also write data to the Flash Memory that may limit the write bandwidth for the host. Excellent Read performance—The random read performance is equivalent to the performance for the Flash Block remapping implementation. Sequential read performance may be worse than a Flash Block remapping implementation if the data was originally written randomly but is read sequentially. Excellent Sequential Write performance—Equivalent to a Flash Block remapping implementation.

Block Remapping Disadvantages: Complexity—Garbage Collection must be performed. In addition, the Mapping Table must be restored when the SSD powers up which is challenging because of the size of the Table. Cost and Power—Logical Block mapping requires a large Table to maintain the Flash Location for each Logical Block. Typically, the map table is implemented with an external DRAM attached to the SSD controller (extra pins, extra board area, and higher power). The Map Table also needs to be restored following reset prior to the host issuing commands that access Flash Memory.

The most common method for implementing a Logical Block Mapping Table is to use an external DRAM where there is one entry for each Logical Block. The main disadvantage to this approach is the size of the DRAM that can be several GB depending on the size of the SSD. An alternative Map Table implementation is to use a cache that holds a subset of the Map Table in internal SRAM. The Map Table consists of a set of Cache Lines that are saved in Flash Memory (e.g. the system data area). A "Map Index" table can be maintained in internal SRAM that points at the locations of the cache lines in Flash Memory. The size of the Map Index table is dependent on the Cache line size and the logical size of the SSD.

For example, assume a 64 GB SSD has 125,000,000 entries. Assuming a Cache line size of 128 entries, the Map Index Table requires 976563 entries. Assuming each Map Cache line is written as a 512-Byte block, the Map Index Table would require 27 bits to specify the Flash location. A total of 3.1 MB would be required to implement the Map Index Table.

The size of the Map Index Table can be reduced by increasing the cache line size or by implementing a larger Physical Sector size (e.g. 4 KB). For example, implementing 4 KB physical sectors reduces the size of the Map Table (and hence the Map Index Table) by a factor of 8.

Cached Mapped Table Advantages: Cost—Eliminating the DRAM saves board area, pins on the controller, and the DRAM devices. However, some of the cost savings are lost due to the larger die area used to implement the internal Map Table Cache. An external (small) DRAM may still be used to hold the Map Index Table which reduces the cost savings. Faster Boot—A cached map table requires only that the Map Cache Index table be loaded before the host can begin issuing commands to access the Flash memory.

Cached Map Table Disadvantages: Higher Random Read Latency—Random reads will have an extremely low hit rate in the internal map cache. Therefore, a read will first be required to load the cache line followed by a read for the actual data. Complexity—The logic to implement a cached Map Table is more complicated than implementing a Map Table in external SDRAM. Higher Write Amplification for Random Writes—When writing random data, the probability of a cache hit is very small. Therefore, it is likely that a Cache Line will be forced out of the Cache (and written to Flash Memory) for every host command. For example, assume the host performs random 4 KB writes and the SSD has a map cache with line size of 128 map entries that consumes 512 B of Flash memory. Each 4 KB write of host data would result in an additional 512-Bytes of map data being written.

A disk drive (HDD or SSD) may have a physical sector size which is different from the logical sector (e.g. logical block) size that is advertised to the host computer. In the past, the sector size on the disk drive is the same size as advertised to the host and is typically 512-Bytes. Enterprise drives often use a sector size which is slightly larger (e.g. 516, 520, or 528) which permits 512-Bytes of data plus 4-16 bytes of metadata. An example is the 8-byte DIF (Data Integrity Field) defined by T10. The use of 512-Byte sectors has been recognized as being inefficient at both the operating system and drive level. However, for legacy reasons, the transition from a 512-Byte sector to a larger sector size has been slow. Operating systems normally use clusters of sectors (allocation units) in managing a volume since it is easier to track a smaller set of larger clusters.

An effort has been underway to move to 4 KB physical sectors on hard drives to make more efficient use of the media. The media is used more efficiently because the ECC code used is a lower percent overhead (i.e. less % overhead when performed over one 4 KB sector than over eight 512-Byte sectors). However, for backward compatibility, the drives would appear as 512-Byte sectors to the host (i.e. 512-Byte emulation).

SSD benefits significantly from implementing 4 KB Physical Sectors and then emulating 512-Byte sectors (if necessary). Compression Ratio—Compressing 4 KB of data produces a significantly higher compression ratio than compressing 512-Bytes of data. Smaller Map Table—The Map Table size can be reduced by a factor of 8 when the drive's physical sector size is 4 KB instead of 512-Bytes. Thus, the amount of external DRAM to hold the Map Table can be much smaller. Consider a 100 GB SSD that has 4-byte Map Table entries. For a 512-Byte physical sector, the Map table required is 745 MB while it is only 93 MB when 4 KB physical sectors are used.

In addition, the Map Table contents are periodically saved in Flash Memory in order to restore the Map Table following a reset or power failure. Note the Map Table contents are also saved in Flash Memory if a caching (DRAM-Less) system is used. A larger Map Table results in less Flash Memory available for host data and hence a higher write amplification. Note that a 0% overprovisioned drive would use ~1.6% of the Flash memory with 512-Byte physical sectors (assuming 4-byte Map table entries and 2 copies of the Map Table in Flash Memory). However, only 0.2% is used when the Physical sector size is 4 KB. Therefore, an SSD that has a 512-Byte physical sector size will be at a performance and cost disadvantage to an SSD that has a 4 KB physical sector size.

512-Byte Emulation: The disadvantage to using a 4 KB Physical sector size is the need to emulate 512-Byte sector sizes to support "legacy" systems. While most transactions will be a multiple of 4 KB and aligned to a 4 KB boundary, the need exists to handle transactions that are misaligned and/or a partial physical sector. Read commands are relatively easy to handle since data from the start of the first physical sector and at the end of the last physical sector may need to be discarded (i.e. not sent to the host). Write commands are more complicated since only a portion of the first and/or last Physical sectors of a command may be written by the host. Therefore, read-modify-write (RMW) operations may need to be performed on these Physical sectors. In other words, 512-Byte I/O operations would be noticeably slower on an SSD with 4 KB physical sectors.

Write Amplification is a measure of the actual data that is written to the Flash memory in an SSD. The write amplification is dependent on the type of Map Table used, the data pattern written by the host (e.g., system metadata, overprovisioning, and other system level features). Write amplification can be expressed by the following formula:

WA=(Data Written to Flash)/(Host Data written to SSD)

A write amplification value of 1.0 would indicate that the same amount of data written by the host is written to the Flash Memory. A value of 2.0 indicates that the amount of data written to the Flash memory is double the amount of host data written to the SSD. The write amplification for Flash block mapping is dependent on the amount of data in each block that must be copied from the existing block. As an example, assume block remapping is used, 256 KB blocks, and the host is performing random 8 KB writes to the SSD. Each I/O operation writes a 256 KB block with 8 KB of the data from the host resulting in a write amplification of 32 (256 KB/8 KB). As a second example, assume that the host is writing data sequentially, the data written in each block would come only from the host resulting in a write amplification of 1.0.

When Logical Block mapping is used, the write amplification is determined by the amount of data from each block that is garbage collected. The write amplification for a block is calculated as following:

WA=(Block Size)/(Block Size−Data in Block Rewritten)

For example, assume that (on average) 25% of each block is garbage (i.e. free space) when the block is recycled. The resulting write amplification would be 4=(1/(1−0.75)).

The life of the Flash memory in an SSD is directly related to the write amplification. The effect of write amplification effectively reduces the number of P/E cycles (by the write amplification). Therefore, techniques that reduce write amplification are important for improving the life of an SSD. Write amplification is also likely to reduce the overall performance of an SSD. The bandwidth for writing data to Flash Memory will be WA times the host write rate. For example, a write amplification of four and a host write rate of 100 MB/s means that the Flash write bandwidth will be 400 MB/s. In addition, the extra write data is mostly data being rewritten (during garbage collection) which requires that the data also be read from the Flash Memory. Therefore, the total Flash Memory bandwidth used to write data to the Flash Memory would be:

Flash Memory $BW$=(2*WA−1)*Host Write Rate

For example, if the host writes data at a rate of 100 MB/s and the write amplification is 4, the Flash Bandwidth used will actually be 700 MB/s (100 MB/s from host, 300 MB/s of data being rewritten, and 300 MB/s to read the data being rewritten).

Overprovisioning is one technique for reducing write amplification. When an SSD is overprovisioned, the SSD has more Flash memory than the advertised size. There are 3 typical values of overprovisioning seen in SSD:

0%—The amount of Flash Memory is the same as the advertised Drive size. For example, a 128 GB drive with 128 GB of Flash Memory is 0% overprovisioned (i.e. the drive has no overprovisioning).

7%—The amount of Flash Memory is ~7% more than the same as the advertised Drive size. For example, a 120 GB drive with 128 GB of Flash Memory is 7% overprovisioned.

28%—The amount of Flash Memory is 28% more than the same as the advertised Drive size. For example, a 100 GB drive with 128 GB of Flash Memory is 28% overprovisioned.

The percent of overprovisioning is expressed as:

% Overprovisioning=100*(Nominal Flash Capacity in GB/Advertised Drive Capacity in GB)

Overprovisioning reduces write amplification because the amount of data that needs to be rewritten during garbage collection is reduced. For example, consider two SSD that each have 128 GB of Flash Memory but one is 0% overprovisioned and the second is 28% overprovisioned. There is an additional 5% of Flash memory available after accounting for bad blocks, metadata, etc. due to the difference between GB for Disk space (1 GB=1,000,000,000 bytes) and GB for Flash (1 GB=1,073,741,824). The 5% extra memory equates to 134.4 GB. With 0% overprovisioning, the worst case free space (i.e. garbage) across all blocks (assuming free space is evenly distributed) will be:

% Average Free Space(0% Overprovisioned)=100* (1−128/134.4)=4.76%

The above means that the write amplification could be as high as 1/0.0476=21. Thus, when choosing a block to garbage collect, it is probable that the amount of free space (i.e. garbage) will be approximately twice the average value which would result in a more realistic worst case write amplification of 1/(2*0.0476)=10.5.

For a 28% overprovisioned SSD, the worst case free space across all blocks will be:

% Average Free Space(28% Overprovisioned)=100* (1−100/134.4)=25.6%

The write amplification will thus be much lower for the 28% overprovisioned drive where the worst case write amplification is 1/0.256=3.91 if free space were evenly distributed across all blocks. However, the write amplification would be a more realistic 1/0.512=1.95 if free space is distributed based on the age of a block.

The disadvantage of overprovisioning is the increased cost per GB. Therefore, consumer drives are normally 0% or 7% overprovisioned to minimize cost per GB while enthusiast and enterprise drives are normally 28% overprovisioned where performance and lifetime are more important.

Compression is one technique for reducing write amplification. An SSD can perform compression at the Logical Block level to reduce the amount of data which is written to Flash Memory. The compression ratio is expressed by the following formula:

Compression Ratio=(Size of Data)/(Size of Compressed Data):1

For example, 64 KB compressed to 32 KB results in a compression ratio of 2:1 (i.e. 2 to 1). A compression ratio of 1:1 indicates that the size of the compressed data equals the size of the original data. A compression ratio less than 1 (e.g. 0.99:1) indicates that the data "expanded" as a result of the compression algorithm. Note that all compression algorithms are expanding because at least 1 additional bit is required to specify whether the data is compressed.

Compression of Logical Block data by an SSD has the effect of reducing the rate at which host data is written to Flash memory but also creates additional free space on the drive. In effect, the overprovisioning of the drive is increased by the amount by which host data is reduced. Thus, the write amplification is reduced because less host data is written but also because the amount of data that is written during garbage collection is reduced.

Consider the case of a 128 GB SSD that is overprovisioned by 0% and data written has an average compression ratio of 2:1. The drive has 134.4 GB of Flash Memory available (assuming 5% extra after accounting for metadata, bad blocks, etc.). Due to compression, the drive only contains 64 GB of data resulting in an effective overprovisioning value of 50%. In the worst case, a block can always be found with at least 50% garbage.

However, the older blocks should have considerably more garbage than newer blocks. For this example, a value of 80% garbage (20% used space) will be assumed. Thus, the write amplification will actually be:

(1/(1−% garbage))/compression Ratio

For the above example, the value is (1/0.8)/2=0.625. When writing random data without compression, a 0% overprovisioned drive would typically have a write amplification of ~10.5 (see Overprovisioning section). However, the same drive with compression (and a compression ratio of 2:1) will have a write amplification of 0.625. The compression ratio that can be achieved is dependent on the type of data being written and the size of the block over which the compression is performed. Encrypted data does not compress much (if at all) because the encryption effectively randomizes the data. Data that has already been compressed will in general not be compressible though a small gain in some cases may be possible.

The larger the data block compressed, the greater the chance of matching a previous string in the history buffer. The history buffer contains the data previously processed in the block being compressed. Compression over 4096 byte data blocks is significantly better than compression over 512-Byte data blocks. Therefore, compression should be performed over as large a block as practical and has the most impact on an SSD which has a larger Physical sector (e.g. 4 KB) as opposed to a Physical sector of 512 bytes.

Compression Advantages: Lower Write Amplification.

Compression Disadvantages: Additional Logic to implement the Compression and Decompression algorithm. Variable size of data Physical Sectors—Compressed Physical Sectors will be packed in Flash Memory (for best use of the Flash memory). Thus, Physical sectors may "straddle" Flash Pages (i.e. start in one Flash Page and continue in another Flash Page). Support for variable sized Physical sectors may be an advantage though in supporting Logical Blocks that have additional information (e.g. a Data Integrity Field) which are not exactly 512 bytes (e.g. 528 bytes). In this case, the logical blocks may not pack nicely into a Flash Page anyway. Higher Latency in the Write Path—Data must first be compressed to determine if the data will be expanded (larger than the original data) to determine if the original data should be written or the compressed data. Latency in the read path is lower because the decompression can be performed in-line. More metadata—Additional metadata (size and possibly a flag indicating if data is compressed) need to be kept for Physical Sectors.

In various embodiments, flash controller 210 incorporates one or more resources for facilitating data services, such as compression and decompression operations that implement some of the advantages discussed above as well as reduce or solve some of the disadvantages discussed above.

Data Services

Figure 3:
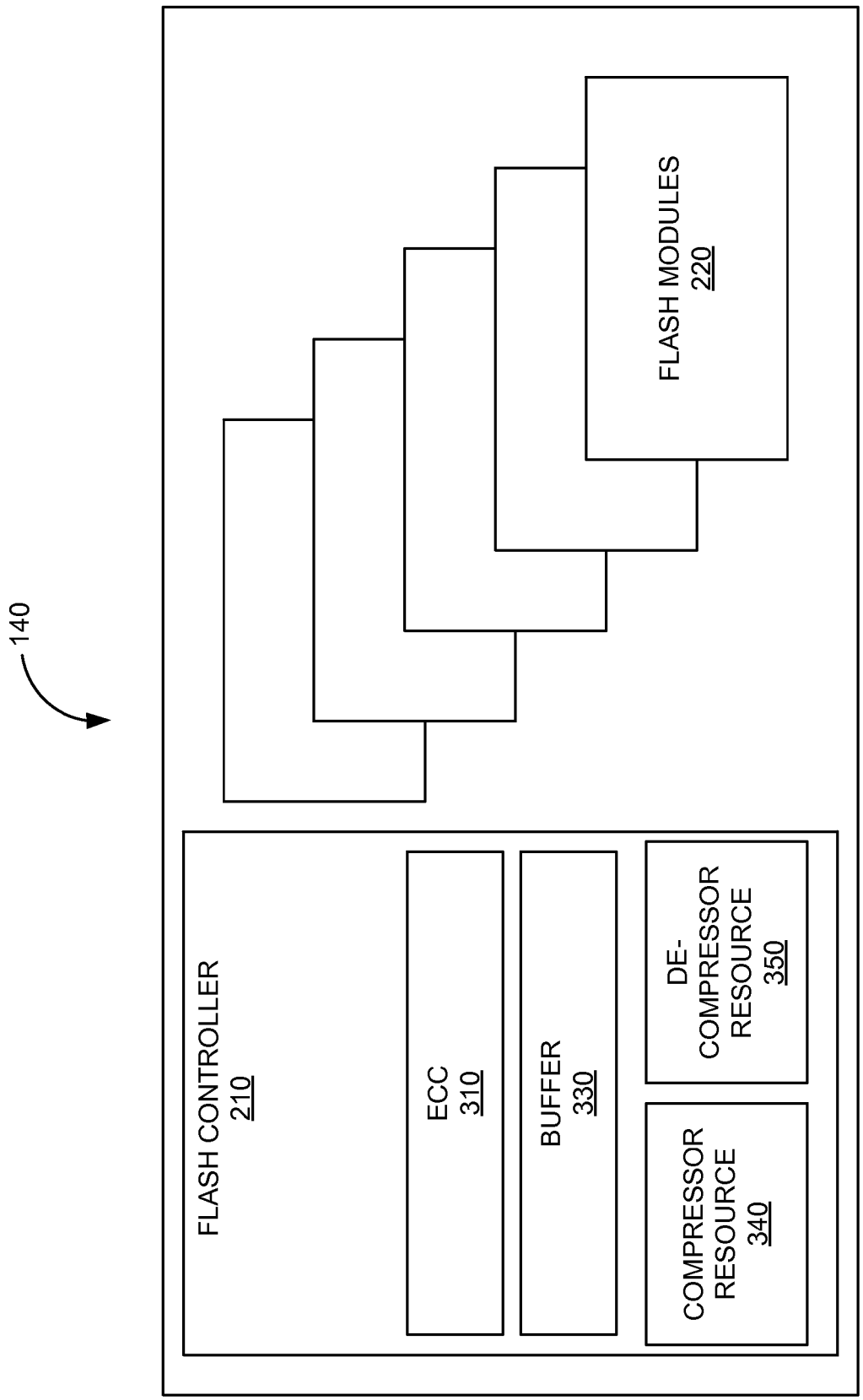
FIG. 3 is a block diagram of a flash card that can be used with the high-density solid-state storage unit of FIG. 1 in one embodiment according to the present invention.

FIG. 3 is a block diagram of one of the plurality of flash cards 140 that can be used with high-density solid-state storage unit 100 of FIG. 1 in one embodiment according to the present invention. In this example, flash card 140 includes flash controller 210 and one or more flash modules 220. In this embodiment, flash controller 210 also includes ECC module 330, buffer module 340, compressor resource 340, and decompressor resource 350 (among other data services not shown).

ECC module 330 includes hardware and/or software elements configured for verifying data by locating and correcting errors. In general, flash modules 220 can require ECC techniques to correct random bit errors ("soft" errors). This is because the inside of a NAND chip can be very noisy and the signal levels of bits passed through a NAND string can be very weak. Error correction can also help to correct bit errors due to wear. Wear can cause bits to become stuck in one state or the other (a "hard" error), and it can increase the frequency of soft errors. Some examples of ECC techniques may include Reed-Solomon coding, Bose-Chaudhuri-Hocquengham (BCH), low-density parity-check (LDPC) code, and other linear error correcting codes. ECC module 330 may incorporate one or more error checking and correcting techniques and data integrity techniques as is known in the art.

In general, bits in a Flash memory may be read incorrectly (i.e. develop bit errors) after being programmed. The charge level on a Flash cell will change due to several conditions (time, temperature, accesses to other pages in the block, etc.). Eventually, when the cell is read, the wrong value is returned. Flash Manufacturers specify a maximum number of bit errors for a Flash Page based on the process technology, cell design, lab testing, simulation, operating conditions, etc. The bit error specification will be N errors per M bytes. The Flash user is then responsible for implementing an Error Correcting Code that satisfies or exceeds the requirement. Flash Manufacturers provide extra bytes in a Flash Page to accommodate the number of expected ECC bits plus a small amount of metadata (e.g. CRC field, sector number, etc.).

The Open NAND Flash Interface (ONFI) Working Group in ONFI 2.3 defines a Flash Page as containing a data area and a spare area. The spare area is intended for use in holding ECC checkbits and metadata while the Data Area is assumed to contain sector (e.g. Logical Block) data. An example error specification is 40-bit errors over 1104 bytes for a Flash Page size of 8832 bytes (1104*8). Assuming the ECC code is BCH14, 70 bytes (e.g. 560 bits=40*14) are required for the ECC bits leaving 10 bytes for metadata. The spare area bytes do not have to be located at the end of the Flash Page. In fact, it is simpler to divide the Flash Page into sections which contain data and the corresponding ECC bits. Each of these "sections" is an E-Page.

An SSD implementation may choose to use a stronger or weaker ECC code (i.e. correct more bits) than required by the manufacturer. Using a stronger ECC code can increase the available life of the Flash. However, to implement a stronger ECC code will require increasing the number of bytes dedicated to the ECC checkbits or a larger E-Page size. Thus, data bytes are "borrowed" for use as ECC bytes. A weaker ECC code may be used during the early life of a device when the number of errors is lower. The use of a weaker ECC code allows some of the ECC bytes to be "stolen" for use as data bytes (which has the effect of increasing the drive overprovisioning. As an example, assume 60 bits (instead of 40) are corrected over 1104 bytes using BCH14. The size of the ECC checkbits field will increase to 14*60=105 bytes (from 70) which reduces the space available for sector data to 999 bytes. Note that the use of stronger ECC has more benefits when applied later in a Flash device's life (since it has the effect of reducing the drive overprovisoning).

Another option is to increase the number of bytes over which the correction is performed (i.e. increasing the E-Page Size). The number of errors which need to be corrected does not increase linearly with size though the actual distribution will be device dependent. For example, a device which requires 40 bits corrected for 1104 bytes may only require 60 bit correction for 2208 bytes for the same device lifetime. The number of ECC bytes required (assuming a BCH15 code) would be 112.5 (15*60) versus 140 bytes (70 for each of two 1104 byte E-Pages).

Buffer 330 includes hardware and/or software elements configured for staging data. For example, buffer 330 may include one or more memory elements configured to stage data to reduce erase/write cycles of flash modules 220.

Compressor resource 340 includes hardware and/or software elements configured for providing a first type or class of data services, such as data compression, data reduction, data deduplication, and the like. Compressor resource 340 may employ some of the first type or class of data services, for example, using compression and data deduplication techniques as are known in the art. In general, compressor resource 340 provides a plurality of modes of operation associated with the first type or class of data services. For example, in one embodiment of a first mode of operation, compressor resource 340 is configured to compress data to be stored in one or more of flash modules 220. In another example, in one embodiment of a second mode of operation, compressor resource 340 is configured to compress data to be stored or used by another entity other than flash controller 210. The first type or class of data services may be provided on an on-demand basis or via one or more scheduling routing.

Decompressor resource 350 includes hardware and/or software elements configured for providing a second type or class of data services, such as data decompression, data reconstruction, data reconstitution, and the like. Decompressor resource 350 may employ some of the second type or class of data services, for example, using decompression and data reconstruction techniques as are known in the art. In general, decompressor resource 350 provides a plurality of modes of operation associated with the second type or class of data services. For example, in one embodiment of a first mode of operation, decompressor resource 350 is configured to decompress data retrieved from one or more of flash modules 220. In another example, in one embodiment of a second mode of operation, decompressor resource 350 is configured to decompress data obtained from another entity other than flash controller 210. The second type or class of data services may be provided on an on-demand basis or via one or more scheduling routing.

Although only compressor resource 340 and decompressor resource 350 are illustrated, flash controller 210 in some embodiments is configured to provide other types or classes of data services, metadata services, or the like, using other resources, not shown. These other resources, for example, may be configured to provide a plurality of modes of operation that also allow for on-demand data services of the corresponding type or class to other entities or resources.

Figure 4:
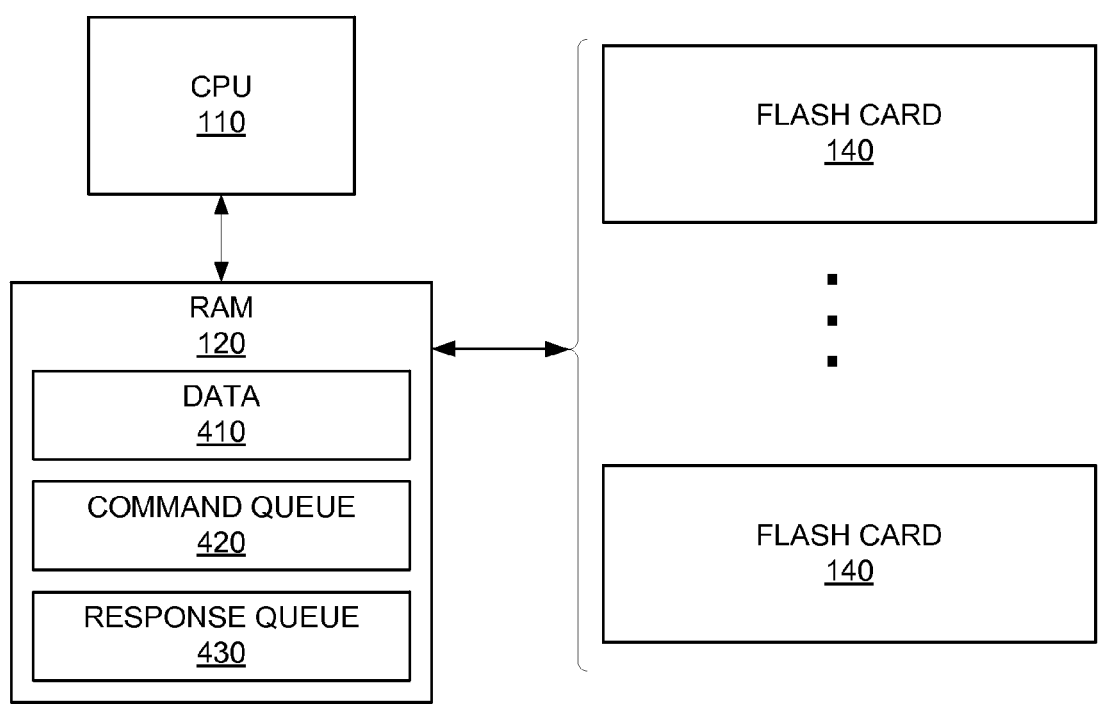
FIG. 4 is a block diagram illustrating compression/decompression management in the high-density solid-state storage unit of FIG. 1 in one embodiment according to the present invention.

FIG. 4 is a block diagram illustrating compression/decompression management in high-density solid-state storage unit 100 of FIG. 1 in one embodiment according to the present invention. In FIG. 4, high-density solid-state storage unit 100 stores data 410, command queue 420, and response queue 430 in RAM 120. In general, data 410 represents information that CPU 110 may store to the plurality of flash cards 140 or that has been retrieved from the plurality of flash cards 140. Data 410 may include compressed information, uncompressed information, error correction or redundancy information, application data, application code, operating system data, firmware, or the like.

In various embodiments, one or more commands are placed into command queue 420. A command may represent one or more operations to be performed by one or more of the plurality of flash cards 140. One example of an operation is to store data 410 to one or more of the plurality of flash cards 140. Another example of an operation is to retrieve information from one or more of the plurality of flash cards 140 as data 410. In one aspect, CPU 110 may instruct one or more of the plurality of flash cards 140 to compress data 410 before storage. CPU 110 may place one or more commands into command queue 420 and provide a pointer to command queue 420 to one or more of the plurality of flash cards 140. In another aspect, CPU 110 may instruct one or more of the plurality of flash cards 140 to decompress information to be stored as data 410. CPU 110 and the plurality of flash cards may perform a variety of operations that directly or indirectly manage insertion, processing, and removal of commands associated with command queue 420.

In various embodiments, one or more responses are placed into response queue 430. A response may represent the result of one or more operations performed by one or more of the plurality of flash cards 140. One example of a response is to provide information indicating the storage of data 410 to one or more of the plurality of flash cards 140. Another example of a response is information indicative of retrieval of information from one or more of the plurality of flash cards 140 as data 410. In one aspect, one or more of the plurality of flash cards 140 may generate a response in response queue 430 indicating that data 410 has been compressed. One or more of the plurality of flash cards 140 may generate a response in response queue 430 indicating that information has been decompressed as data 410. CPU 110 and the plurality of flash cards may perform other operations that directly or indirectly manage the insertion and the removal of responses in response queue 430.

In one aspect, there can be multiple command response and queues. In one implementation, command and response queues are unique to each flash card. In addition, each resource or "data service" provided by a resource of a flash card may have dedicated command queues and response queues (e.g. a compress command queue, decompress command queue, compress response queue, and decompress queue).

In various aspects, CPU 110 manages storage of data in flash cards 140 using command queue 420. CPU 110 may allocate one or more portions of data 410 to be stored in one or more of the plurality of flash cards 140. CPU 110 may maintain tables, lists, or queues of portions of data to be stored in each of the flash cards 140. CPU 110 may implement RAID (redundant array of independent disks; originally redundant array of inexpensive disks) as a way of storing the same portions of the data in different places (thus, redundantly) on multiple flash cards. By placing data on multiple disks, I/O (input/output) operations can overlap in a balanced way, improving performance. One technique called striping provides no redundancy of data but offers better performance as the data can be read simultaneously from individual flash cards 140. Another technique called mirroring provides duplication of the storage of data. Mirroring provides fault-tolerance. Combinations of mirroring and striping can include the further determination of data recovery information, such as data checks and parity calculations.

Knowing that compression will occur and that mirror, striping, and other data recovery operations need to happen on the compressed data, in another aspect, CPU 110 takes advantage of a variety of types or classes of data services, such as data reduction and data reconstruction service, provided by resources incorporated into flash cards 140.

Figure 5:
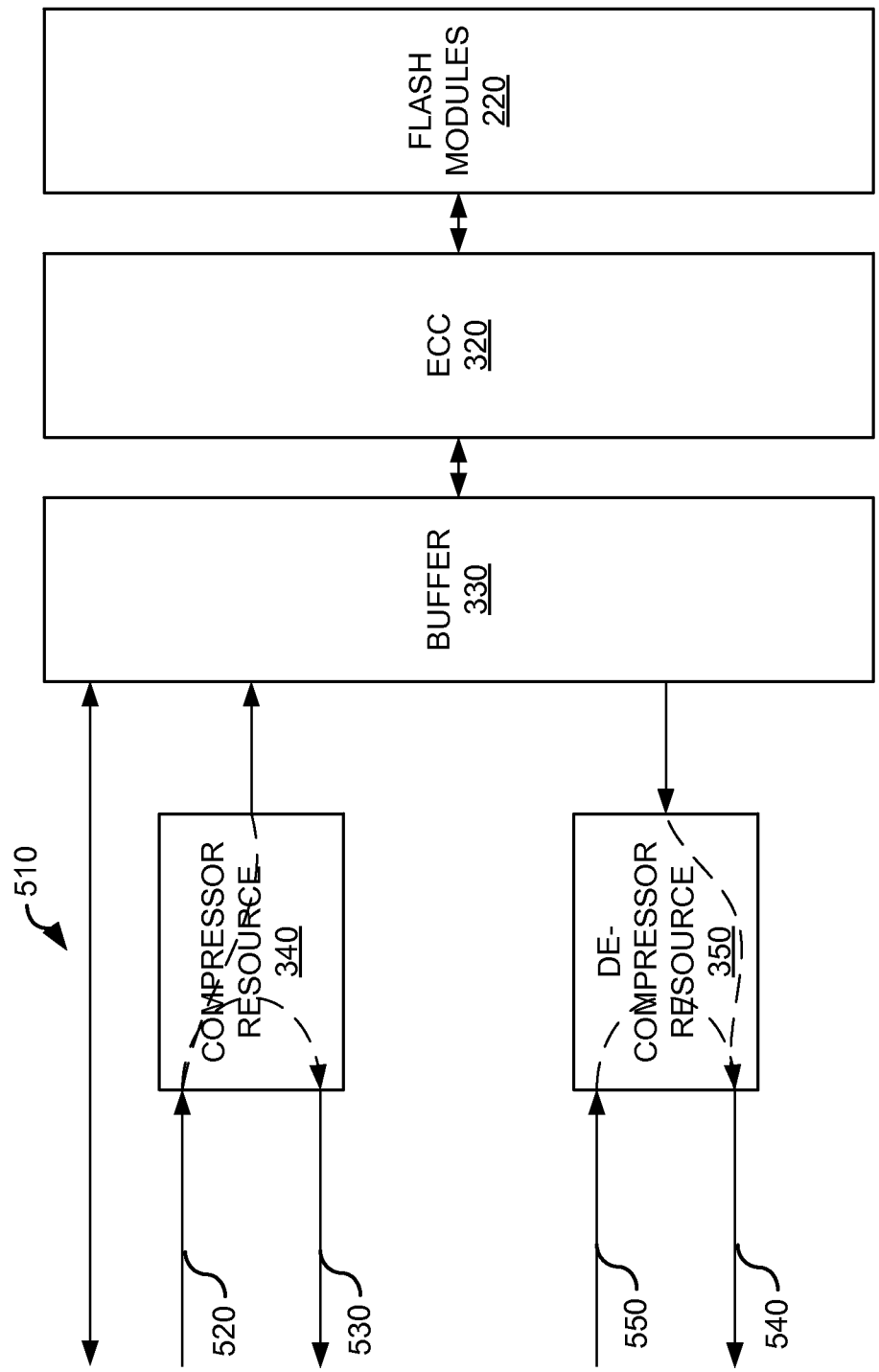
FIG. 5 is a block diagram illustrating data reduction aspects of the high-density solid-state storage unit of FIG. 1 in one embodiment according to the present invention.

FIG. 5 is a block diagram illustrating data reduction aspects of high-density solid-state storage unit 100 of FIG. 1 in one embodiment according to the present invention. In general, data 510 received by flash card 140 may be stored in one or more of flash modules 220 by directly staging data 510 in buffer 330. Data 510 may also be retrieved from one or more of flash modules 220 and staged in buffer 330 for transfer to RAM 110. Data 510 may be transferred in an unaltered state. In further embodiments, flash card 140 may be utilized as a resource to compress or decompress data not otherwise stored in flash modules 220.

In some embodiments, data 520 is compressed or otherwise encoded using one or more data reduction techniques at compressor resource 340. Data 520 after being compressed may be stored in one or more of flash modules 220 by compressor resource 340 staging the compressed data in buffer 330. In various embodiments, compressor resource 340 can be utilized to compress any type of data in-line for storage in one or more of flash modules 220 as well as an on-demand data reduction service by high-density solid-state storage unit 100. In one aspect, compressor resource 340 is configured to route the compressed data as data 530 for further handling by flash controller 210 or CPU 110. Accordingly, high-density solid-state storage unit 100 may be configured to utilize any compressor resource 340 in flash controller 210 of any one of the plurality of flash cards 140 on-demand to perform data reduction services on any type of data.

Figure 6:
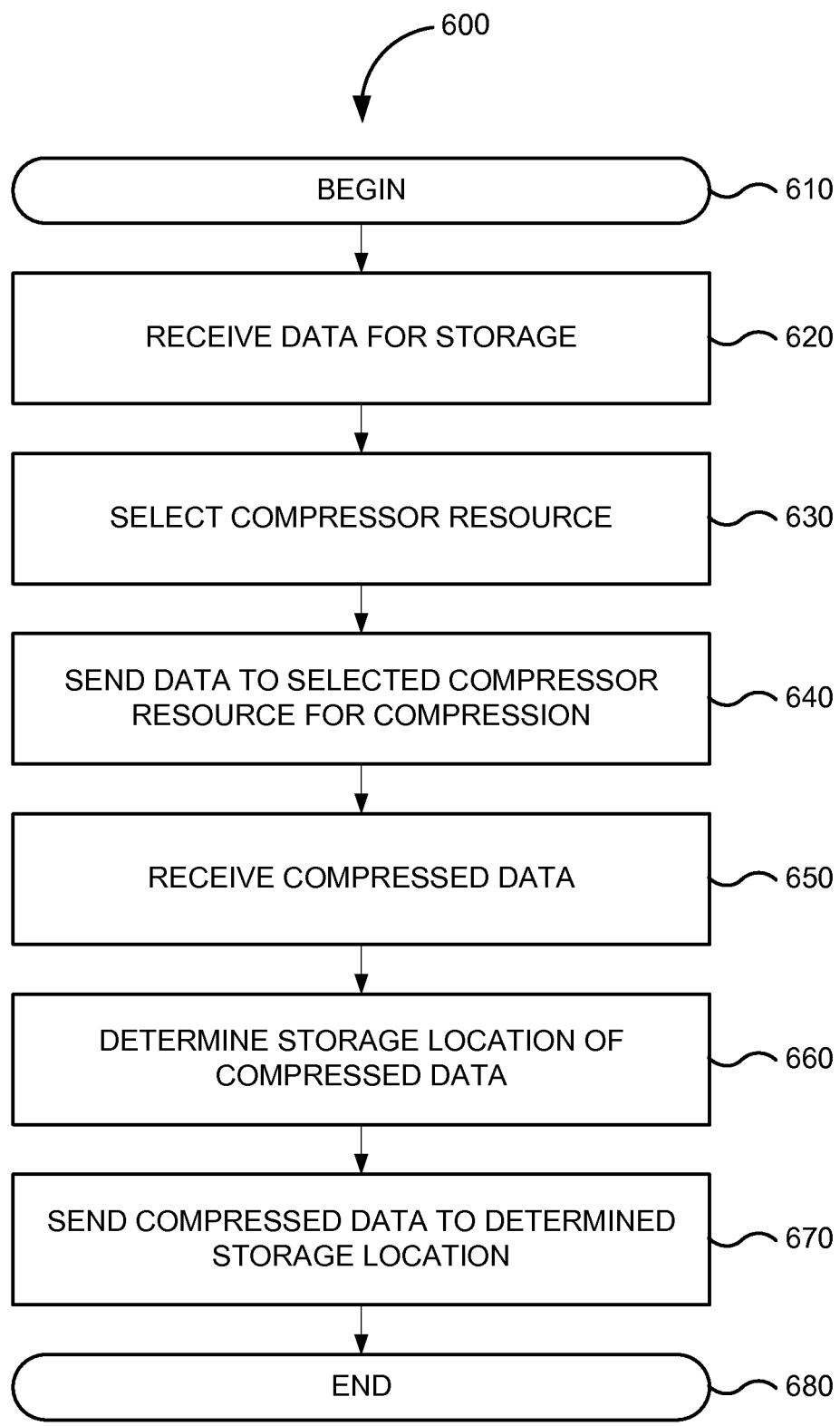
FIG. 6 is a flowchart of a method for utilizing compressor resources for data reduction in one embodiment of the present invention.

FIG. 6 is a flowchart of method 600 for utilizing compressor resources for data reduction in one embodiment of the present invention. Implementations of or processing in method 600 depicted in FIG. 6 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 600 depicted in FIG. 6 begins in step 610.

In step 620, data is received for storage. For example, information may be forwarded by network interface 150 to CPU 110 according to a storage protocol. CPU 110 may store the information as data 410 of FIG. 4.

In step 630, a compressor resource is selected. In various embodiments, CPU 110 may select one or more of the plurality of flash cards 140 as the compressor resource. CPU 110 may implement one or more scheduling algorithms or load-balancing algorithms in selecting a resource. CPU 110 may further maintain usage information, availability information, or other lists about the plurality of flash cards 140 to determine which one to select. The selection process may further be influenced by storage algorithms (such as RAID techniques) that mirror or strip the data across one or more of the plurality of flash cards 140.

In step 640, the data is sent to the selected compressor resource for compression. In one embodiment, CPU 110 may forward the data directly to a selected one of the plurality of flash cards 140. In another example, one of the plurality of flash cards 140 may be instructed to retrieve a command from command queue 420 that indicates that data 410 is to be compressed. The one of the plurality of flash cards 140 then may retrieve data 410 from RAM 120. In step 650, the compressed data is received. As depicted in FIG. 5, data 520 may be compressed using compressor resource 340 and returned to RAM 120.

In step 660, a location for the compressed data is determined. In various embodiments, the one of the plurality of flash cards 140 that was selected as the compressor resource may be selected as the location for the compressed data. In other embodiments, the one of the plurality of flash cards 140 selected as the location of the compressed data may be different from the one selected as the compressor resource. CPU 110 may implement one or more scheduling algorithms or load-balancing algorithms in selecting a location. CPU 110 may further maintain usage information, availability information, or other lists about the plurality of flash cards 140 to determine which one to select. The selection process may further be influenced by storage algorithms (such as RAID techniques) and mirror or stripe the data across one or more of the plurality of flash cards 140.

In step 670, the compressed data is sent to the selected location. In one embodiment, CPU 110 may forward the compressed data directly to a selected one of the plurality of flash cards 140. In another example, one of the plurality of flash cards 140 may be instructed to retrieve a command from command queue 420 that indicates that the compressed data as data 410 is to be stored. The one of the plurality of flash cards 140 then may retrieve data 410 from RAM 120. The compressed data is then stored. As depicted in FIG. 5, data 510 may flow directly into buffer 330 for storage in flash modules 220. FIG. 6 ends in step 680.

Figure 7:
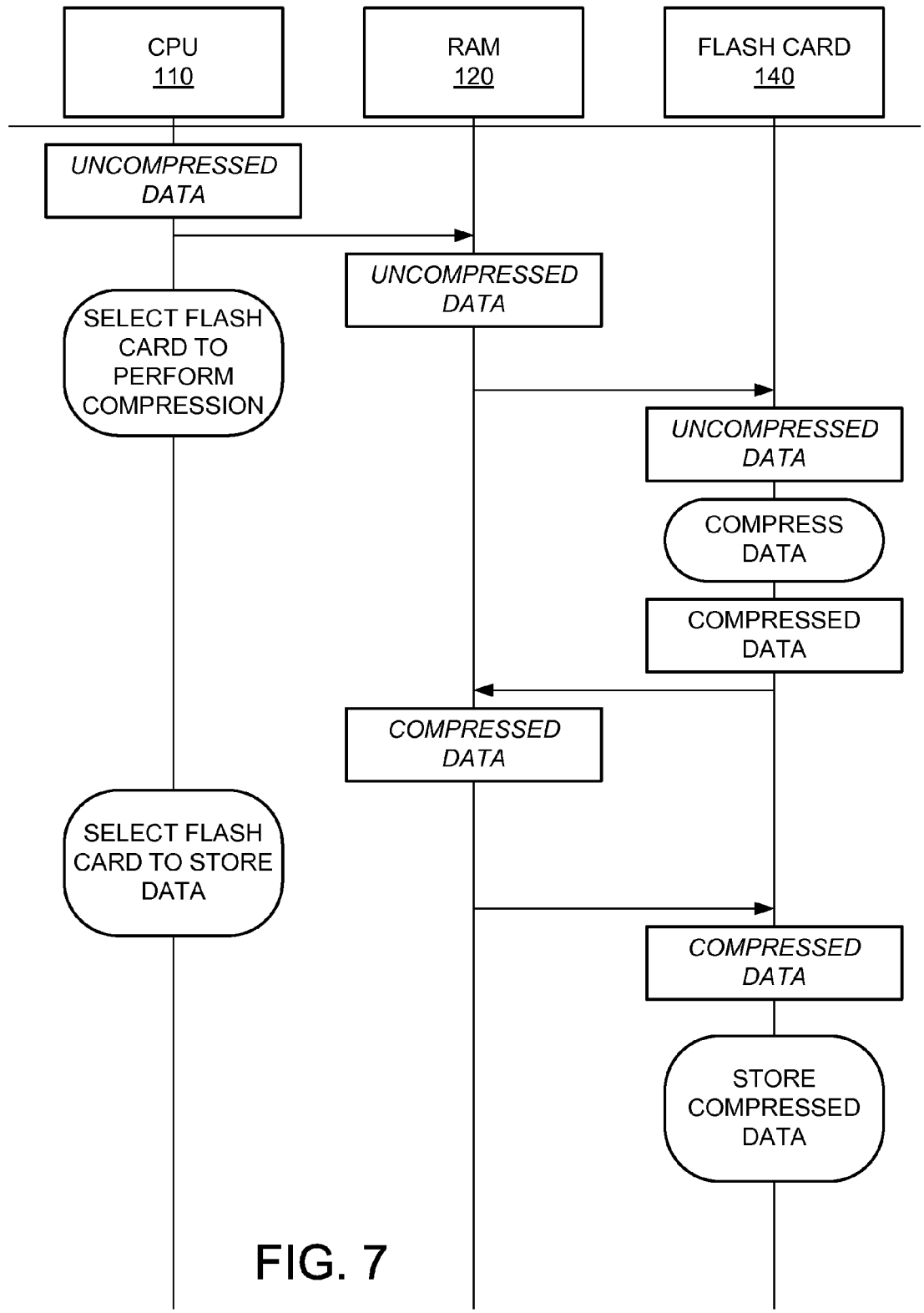
FIG. 7 is a sequence chart indicating data flow according to the method of FIG. 6 in one embodiment according to the present invention.

FIG. 7 is a sequence chart indicating data flow according to method 600 of FIG. 6 in one embodiment according to the present invention.

Returning to FIG. 5, in some embodiments, data 540 is decompressed or otherwise decoded using one or more data reconstruction techniques at decompressor resource 350. Data may be retrieved from flash modules 220 and staged in buffer 330 for decompression by decompressor resource 350 as data 540. In various embodiments, decompressor resource 350 can be utilized to decompress any type of data in-line stored in one or more of flash modules 220 as well as an on-demand data reconstruction service by high-density solid-state storage unit 100. In one aspect, decompressor resource 350 is configured to route the decompressed data as data 540 for further handing by flash controller 210 or CPU 110. Accordingly, high-density solid-state storage unit 100 may be configured to utilize any decompressor resource 350 in flash controller 210 of any one of the plurality of flash cards 140 on-demand to perform data reconstruction services on any type of data.

Figure 8:
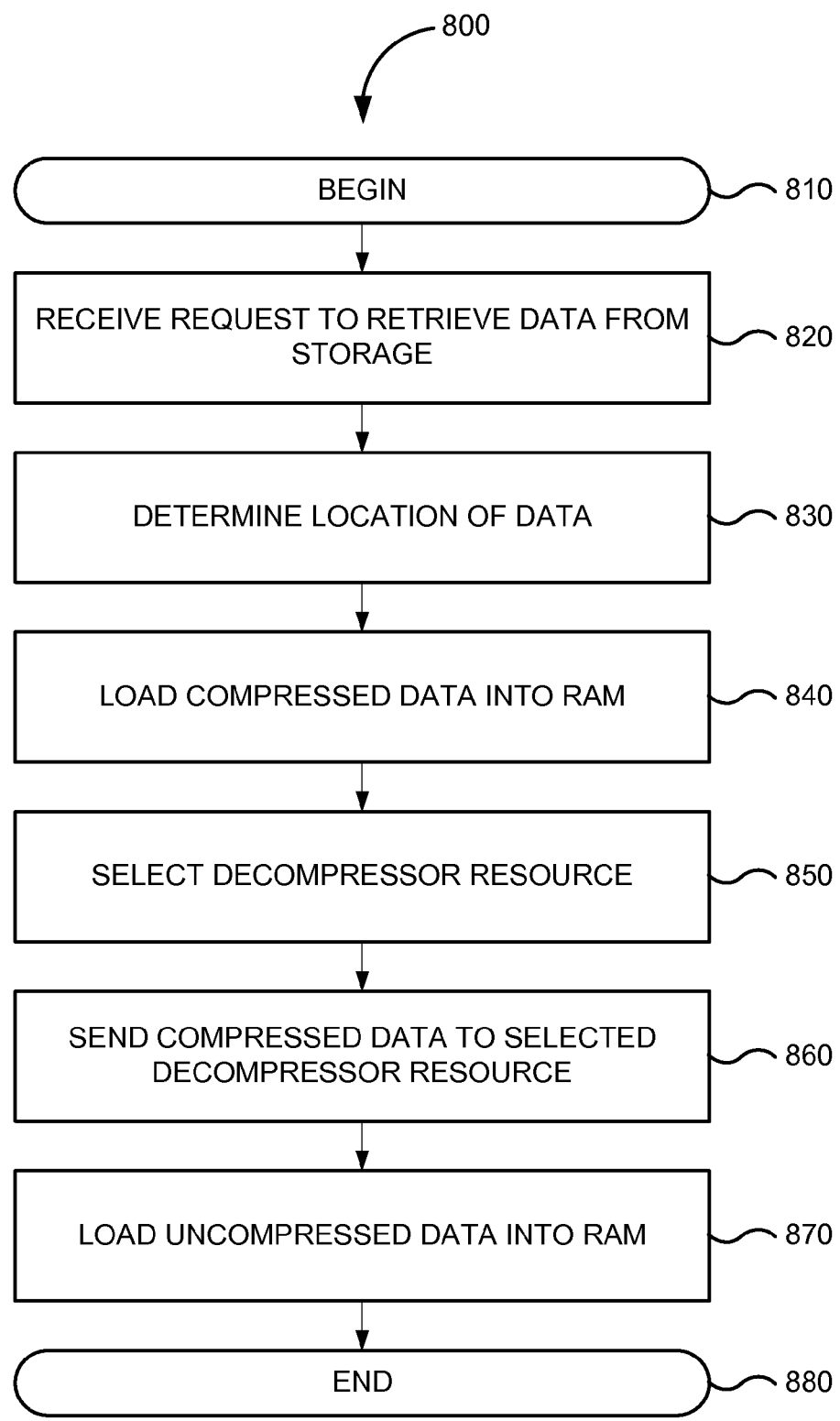
FIG. 8 is a flowchart of a method for utilizing decompressor resources for data reconstruction in one embodiment of the present invention.

FIG. 8 is a flowchart of method 800 for utilizing decompressor resources for data reconstruction in one embodiment of the present invention. Implementations of or processing in method 800 depicted in FIG. 8 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 800 depicted in FIG. 8 begins in step 810.

In step 820, a request is received to retrieve data for storage. For example, information may be forwarded by network interface 150 to CPU 110 according to a storage protocol requesting one or more block, sectors, or units of data. In step 830, the location of the data is determined. CPU 110 may determine the location of the data using mapping table as discussed above. The mapping table may indicate that one or more of the plurality of flash cards 140 stores the requested data.

In step 840, the compressed data is loaded into RAM. In step 850, a decompressor resource is selected. In various embodiments, CPU 110 may select one or more of the plurality of flash cards 140 as the decompressor resource. CPU 110 may implement one or more scheduling algorithms or load-balancing algorithms in selecting a resource. CPU 110 may further maintain usage information, availability information, or other lists about the plurality of flash cards 140 to determine which one to select.

In step 860, the compressed data is sent to the selected decompressor resource for data reconstruction. In one embodiment, CPU 110 may forward the compressed data directly to a selected one of the plurality of flash cards 140. In another example, one of the plurality of flash cards 140 may be instructed to retrieve a command from command queue 420 that indicates that data 410 is to be decompressed. The one of the plurality of flash cards 140 then may retrieve data 410 from RAM 120.

In step 870, the decompressed data is loaded into RAM. As depicted in FIG. 5, data 550 may be decompressed using decompressor resource 350 and returned to RAM 120. FIG. 8 ends in step 880.

Figure 9:
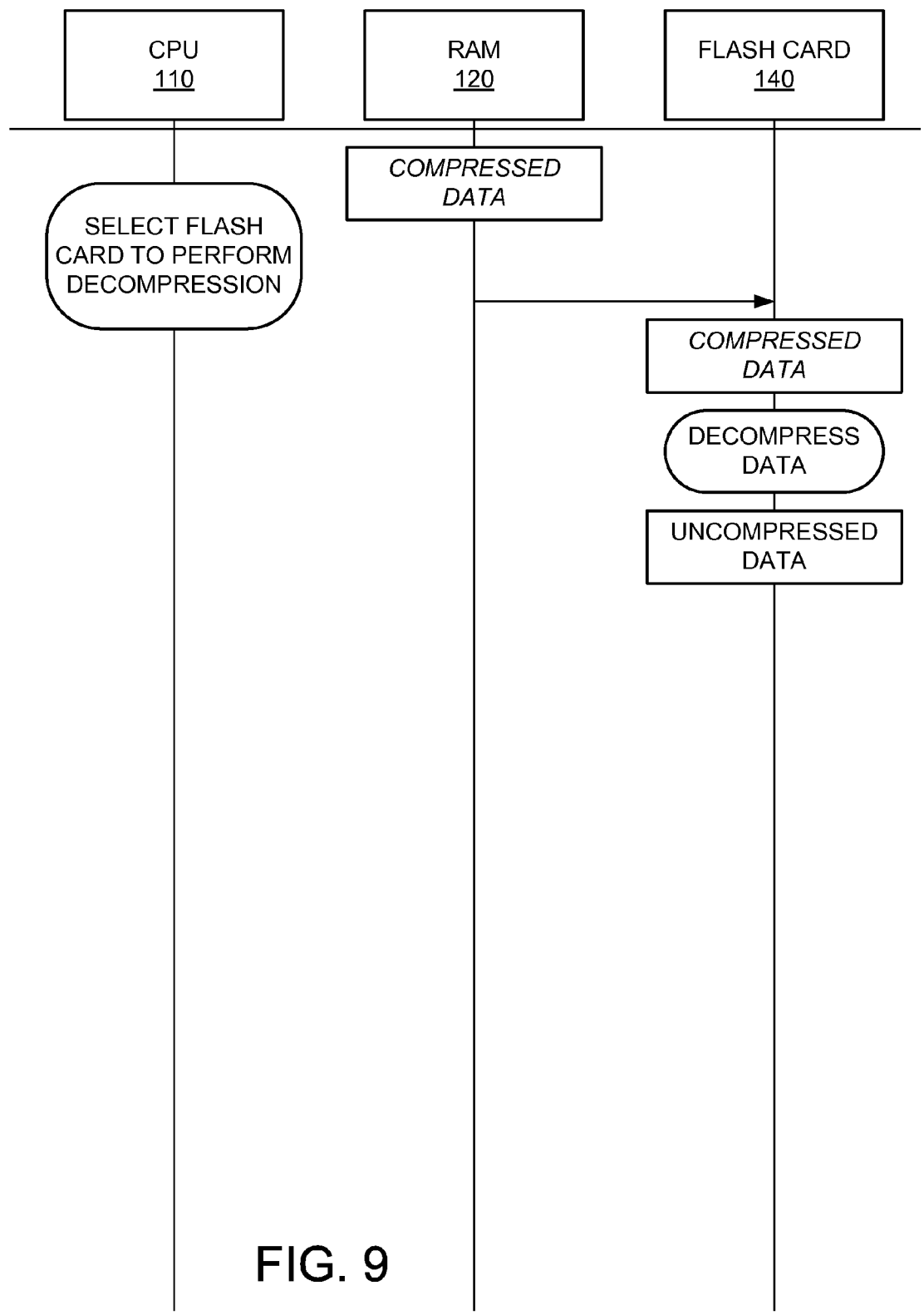
FIG. 9 is a sequence chart indicating data flow according to the method of FIG. 8 in one embodiment according to the present invention.

FIG. 9 is a sequence chart indicating data flow according to the method of FIG. 8 in one embodiment according to the present invention.

Conclusion

Figure 10:
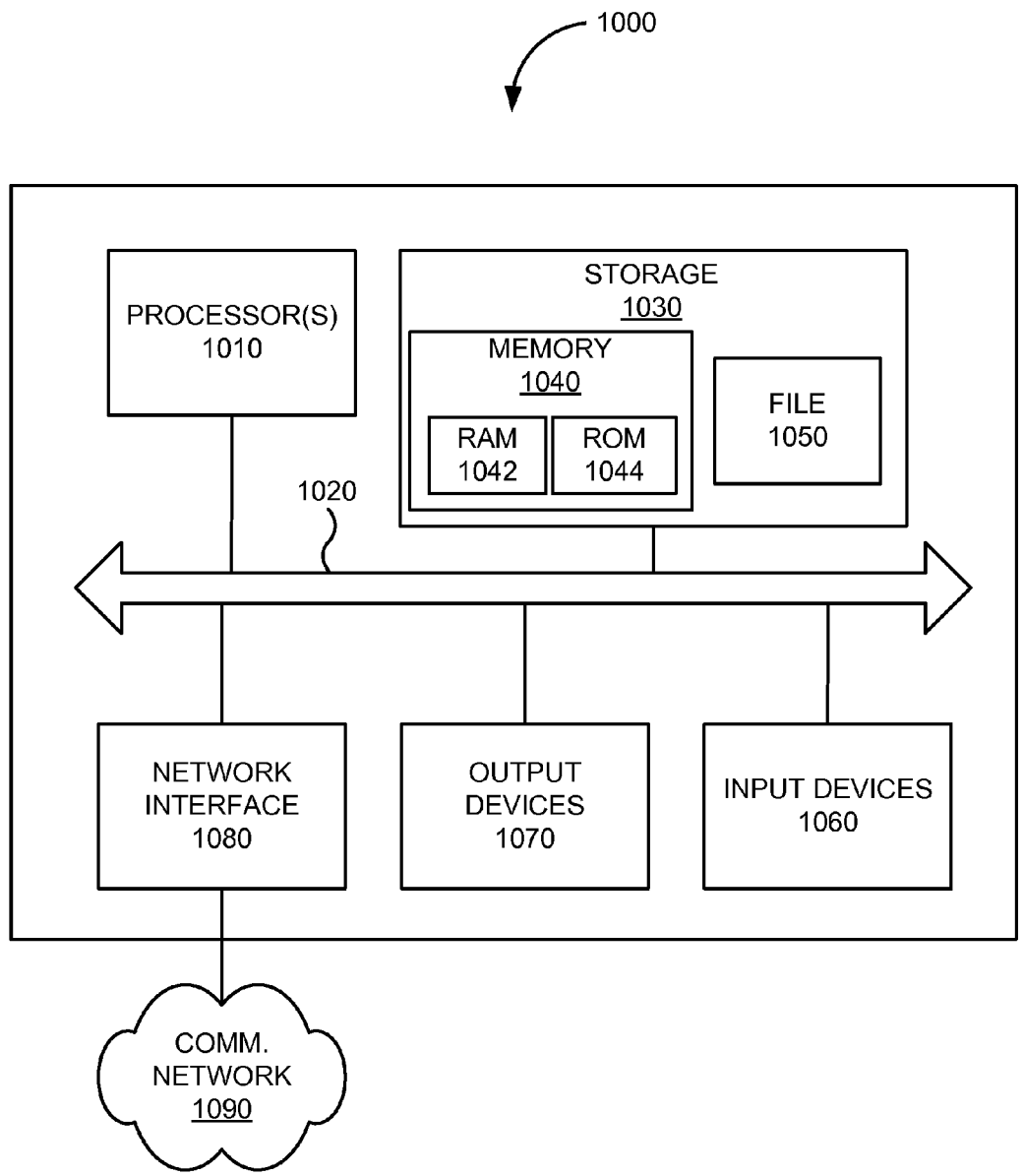
FIG. 10 is a simplified block diagram of a computer system that may be used to practice embodiments of the present invention.

FIG. 10 is a simplified block diagram of computer system 1000 that may be used to practice embodiments of the present invention. As shown in FIG. 10, computer system 1000 includes processor 1010 that communicates with a number of peripheral devices via bus subsystem 1020. These peripheral devices may include storage subsystem 1030, comprising memory subsystem 1040 and file storage subsystem 1050, input devices 1060, output devices 1070, and network interface subsystem 1080.

Bus subsystem 1020 provides a mechanism for letting the various components and subsystems of computer system 1000 communicate with each other as intended. Although bus subsystem 1020 is shown schematically as a single bus, alternative embodiments of the bus subsystem may utilize multiple busses.

Storage subsystem 1030 may be configured to store the basic programming and data constructs that provide the functionality of the present invention. Software (code modules or instructions) that provides the functionality of the present invention may be stored in storage subsystem 1030. These software modules or instructions may be executed by processor(s) 1010. Storage subsystem 1030 may also provide a repository for storing data used in accordance with the present invention. Storage subsystem 1030 may comprise memory subsystem 1040 and file/disk storage subsystem 1050.

Memory subsystem 1040 may include a number of memories including a main random access memory (RAM) 1042 for storage of instructions and data during program execution and a read only memory (ROM) 1044 in which fixed instructions are stored. File storage subsystem 1050 provides persistent (non-volatile) storage for program and data files, and may include a hard disk drive, a floppy disk drive along with associated removable media, a Compact Disk Read Only Memory (CD-ROM) drive, a DVD, an optical drive, removable media cartridges, and other like storage media.

Input devices 1060 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 1000.

Output devices 1070 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 1000.

Network interface subsystem 1080 provides an interface to other computer systems, devices, and networks, such as communications network 1090. Network interface subsystem 1080 serves as an interface for receiving data from and transmitting data to other systems from computer system 1000. Some examples of communications network 1090 are private networks, public networks, leased lines, the Internet, Ethernet networks, token ring networks, fiber optic networks, and the like.

Computer system 1000 can be of various types including a personal computer, a portable computer, a workstation, a network computer, a mainframe, a kiosk, or any other data processing system. Due to the ever-changing nature of computers and networks, the description of computer system 1000 depicted in FIG. 10 is intended only as a specific example for purposes of illustrating the preferred embodiment of the computer system. Many other configurations having more or fewer components than the system depicted in FIG. 10 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A solid-state storage unit comprising:
   a plurality of solid-state storage devices configured to store data;
   each solid-state storage device comprising a plurality of flash modules, and its own compressor resource and decompressor resource, wherein the compressor resource is configured to perform compressor data services and the decompressor resource is configured to perform decompressor data services;
   circuitry configured to store data to and retrieve data from each of the plurality of solid-state storage devices;
   wherein the solid state storage unit is configured to at least one of:
      in response to at least one of a scheduling algorithm and a load-balancing algorithm for the compressor data services, send data from a computing device to one of the plurality of solid-state storage devices, perform decompressor data services on the data in a different one of the plurality of solid-state storage devices, and store the compressed data in a different one of the plurality of solid-state storage devices; and
      in response to at least one of a scheduling algorithm and a load-balancing algorithm for the decompressor data services, retrieve data from one of the plurality of solid-state storage devices, perform decompressor data services on the data in a different one of the plurality of solid-state storage devices, and send the decompressed data to the computing device.

2. The solid-state storage unit of claim 1 wherein the compressor data services include at least one or more of data compression, data reduction and data deduplication.

3. The solid-state storage unit of claim 1 wherein the decompressor data services include at least one or more of data decompression, data reconstruction and data reconstitution.

4. The solid-state storage unit of claim 1 wherein the solid state storage devices are flash cards.

5. A high-density solid-state storage system comprising: a processor;
   a plurality of solid-state storage devices, each solid-state storage device having its own controller device and a plurality of flash modules, the controller device configured to control data transfers between the processor and the plurality of flash modules, the controller further configured to provide compressor or decompressor data services to the plurality of flash modules; and
   a memory configured to store a set of instructions which when executed by the processor configure the processor to at least one of:
      in response to at least one of a scheduling algorithm and a load-balancing algorithm for the compressor data services, send data from the processor to one of the plurality of solid-state storage devices, instruct the controller on the one of the plurality of solid-state storage devices to perform compressor data services on the data, and instruct a different one of the plurality of solid-state storage devices to store the compressed data;
      in response to at least one of a scheduling algorithm and a load-balancing algorithm for the decompressor data services, instruct one of the plurality of solid-state storage devices to retrieve data, instruct the controller of a different one of the plurality of solid-state storage devices to perform decompressor data services on the data, and send the decompressed data to the processor.

6. The high-density solid-state storage system of claim 5 wherein the compressor data services provided to the processor include at least one or more of data compression, data reduction and data deduplication.

7. The high-density solid-state storage system of claim 5 wherein the decompressor data services provided to the processor include at least one or more of data decompression, data reconstruction and data reconstitution.

8. The high-density solid-state storage system of claim 5 wherein the solid state storage devices are flash cards.

9. A method comprising:
   managing a plurality of solid-state storage devices configured to store data; each solid-state storage devices comprising a plurality of flash modules, and its own compressor resource and decompressor resource, wherein the compressor resource is configured to perform compressor data services and the decompressor resource is configured to perform decompressor data services, wherein each of the plurality of solid-state storage devices is configured to store and retrieve data;
performing at least one of the following:
   in response to at least one of a scheduling algorithm and a load-balancing algorithm for the compressor data services, sending data from a processor to one of the plurality of solid-state storage devices, performing compressor data services on the data in the one of the plurality of solid-state storage devices, and storing the compressed data in a different one of the plurality of solid-state storage devices;
   in response to at least one of a scheduling algorithm and a load-balancing algorithm for the decompressor data services, retrieving data from one of the plurality of solid-state storage devices, performing decompressor data services on the data in a different one of the plurality of solid-state storage devices, and sending the decompressed data to the processor.

10. The method of claim 9 wherein the compressor data services provided to the processor include at least one or more of data compression, data reduction and data deduplication.

11. The method of claim 9 wherein the decompressor data services provided to the processor include at least one or more of data decompression, data reconstruction and data reconstitution.

12. The method of claim 9 wherein to select one of the plurality of solid-state storage devices the processor is configured to determine availability of the compressor or decompressor data services of each of the plurality of solid-state storage devices.

13. The method of claim 9 wherein the sod state storage devices are flash cards.

* * * * *